United States Patent
Sasaki et al.

(10) Patent No.: US 6,373,793 B1
(45) Date of Patent: Apr. 16, 2002

(54) MULTIBEAM OPTICAL DISK READOUT METHOD AND APPARATUS

(75) Inventors: Toshihiro Sasaki, Musashimurayama (JP); Zvika Daube; Koby Finkelstein, both of Kafar Saba (IL)

(73) Assignee: Zen Research (Ireland), Ltd., Dublin (IE)

(*) Notice: Subject to any disclaimer, the term of this patent is extended or adjusted under 35 U.S.C. 154(b) by 0 days.

(21) Appl. No.: 09/529,500

(22) PCT Filed: Sep. 22, 1998

(86) PCT No.: PCT/JP98/04268

§ 371 Date: Apr. 13, 2000

§ 102(e) Date: Apr. 13, 2000

(87) PCT Pub. No.: WO99/19867

PCT Pub. Date: Apr. 22, 1999

(30) Foreign Application Priority Data

Oct. 14, 1997 (JP) ............................................. 9-297803

(51) Int. Cl.[7] ............................................. G11B 17/22
(52) U.S. Cl. ................................. 369/30.1; 369/44.37
(58) Field of Search ........................ 369/32, 33, 44.28, 369/44.27, 44.26, 44.34, 44.37

(56) References Cited

U.S. PATENT DOCUMENTS

| | | | | |
|---|---|---|---|---|
| 4,494,154 A | * | 1/1985 | Akiyama | 386/70 |
| 4,539,665 A | * | 9/1985 | Iso et al. | 369/44.25 |
| 4,759,007 A | * | 7/1988 | Eberly | 369/58 |
| 5,054,013 A | * | 10/1991 | Kawamura | 369/44.28 |
| 5,457,670 A | | 10/1995 | Maeda et al. | 369/44.28 |
| 5,483,515 A | * | 1/1996 | Cheng et al. | 369/32 |
| 5,583,836 A | * | 12/1996 | Rokutan et al. | 369/44.28 |
| 5,638,350 A | * | 6/1997 | Fuji | 369/44.37 |
| 6,144,626 A | * | 11/2000 | Naito | 369/32 |

FOREIGN PATENT DOCUMENTS

| | | |
|---|---|---|
| EP | 0 441 435 A1 | 8/1991 |
| WO | WO 94/19797 | 9/1999 |

* cited by examiner

*Primary Examiner*—Tan Dinh
(74) *Attorney, Agent, or Firm*—Fish & Neave; Nicola A. Pisano; Michael J. DeHaemer, Jr.

(57) ABSTRACT

In a CD-ROM reader system wherein five adjacent tracks of a CD-ROM are separately illuminated by five light beams of an optical pickup, a recorded data readout system simultaneously reads the recorded data of the separate tracks by detecting the received light outputs of the returned beams, and outputs the data in the sequence in which it was recorded. For example, if one light beam becomes unreadable by the recorded data readout system, the system will read the recorded data using the remaining four light beams. This readout is performed in recurring operations in which data is read for approximately one revolution of the CD-ROM; then, after there are no longer any gaps in the combined data, the pickup is track-jumped forward by approximately two tracks. At this point the recorded data is again read for one revolution, and the process repeats.

6 Claims, 20 Drawing Sheets

FIG. 5

| 33₁ MEMORY | A₁ₛ | A₁ₑ | | | | | | a₁ₛ | a₁ₑ | | | | |
|---|---|---|---|---|---|---|---|---|---|---|---|---|---|
| 23:40:60 | A₁ₛ(1) | A₁ₑ(1) | | | | | | a₁ₛ(1) | a₁ₑ(1) | | | | |
| 23:40:61 | A₁ₛ(2) | A₁ₑ(2) | | | | | | a₁ₛ(2) | a₁ₑ(2) | | | | |
| ...... | | | | | | | | ...... | | | | | |
| 23:40:74 | A₁ₛ(15) | A₁ₑ(15) | | | | | | 23:41:48 | | | | | |
| | | | | | | | | 23:41:49 | | | | | |
| | | | | | | | | 23:41:62 | a₁ₛ(15) | a₁ₑ(15) | | | |

1ST AREA — 2ND AREA

| | $A_{1s}$ | $A_{1e}$ | | | | | $a_{1s}$ | $a_{1e}$ | | | |
|---|---|---|---|---|---|---|---|---|---|---|---|
| $33_1$ MEMORY | 23:40:60 | $A_{1s}(1)$ | $A_{1e}(1)$ | | | | 23:41:33 | $a_{1s}(1)$ | $a_{1e}(1)$ | | |
| | 23:40:61 | $A_{1s}(2)$ | $A_{1e}(2)$ | ...... | | | 23:41:34 | $a_{1s}(2)$ | $a_{1e}(2)$ | ...... | |
| | 23:40:74 | $A_{1s}(15)$ | $A_{1e}(15)$ | | | | 23:41:47 | $a_{1s}(15)$ | $a_{1e}(15)$ | | |

1ST AREA | 2ND AREA $AT_1$

| | $A_{2s}$ | $A_{2e}$ | | | | $a_{2s}$ | $a_{2e}$ | | |
|---|---|---|---|---|---|---|---|---|---|
| $33_2$ | 23:41:00 | $A_{2s}(1)$ | $A_{2e}(1)$ | | | 23:41:48 | $a_{2s}(1)$ | $a_{2e}(1)$ | |
| | 23:41:01 | $A_{2s}(2)$ | $A_{2e}(2)$ | ...... | | 23:41:49 | $a_{2s}(2)$ | $a_{2e}(2)$ | ...... |
| | 23:41:14 | $A_{2s}(15)$ | $A_{2e}(15)$ | | | 23:42:62 | $a_{2s}(15)$ | $a_{2e}(15)$ | |

$AT_2$

| | $A_{3s}$ | $A_{3e}$ | | | | $a_{3s}$ | $a_{3e}$ | | |
|---|---|---|---|---|---|---|---|---|---|
| $33_3$ | 23:41:15 | $A_{3s}(1)$ | $A_{3e}(1)$ | | | 23:42:63 | $a_{3s}(1)$ | $a_{3e}(1)$ | |
| | 23:41:16 | $A_{3s}(2)$ | $A_{3e}(2)$ | ...... | | 23:42:64 | $a_{3s}(2)$ | $a_{3e}(2)$ | ...... |
| | 23:41:29 | $A_{3s}(15)$ | $A_{3e}(15)$ | | | 23:42:02 | $a_{3s}(15)$ | $a_{3e}(15)$ | |

$AT_3$

| | $A_{4s}$ | $A_{4e}$ | | | | $a_{4s}$ | $a_{4e}$ | | |
|---|---|---|---|---|---|---|---|---|---|
| $33_4$ | 23:41:30 | $A_{4s}(1)$ | $A_{4e}(1)$ | | | 23:42:03 | $a_{4s}(1)$ | $a_{4e}(1)$ | |
| | 23:41:31 | $A_{4s}(2)$ | $A_{4e}(2)$ | ...... | | 23:42:04 | $a_{4s}(2)$ | $a_{4e}(2)$ | ...... |
| | 23:41:44 | $A_{4s}(15)$ | $A_{4e}(15)$ | | | 23:42:17 | $a_{4s}(15)$ | $a_{4e}(15)$ | |

$AT_4$

| | $A_{5s}$ | $A_{5e}$ | | | | $a_{5s}$ | $a_{5e}$ |
|---|---|---|---|---|---|---|---|---|
| $33_5$ | | | | ...... | ...... | | ...... | ...... |

| 33₁ MEMORY | A₁ₛ | A₁ₑ | | | | |
|---|---|---|---|---|---|---|
| | 23:40:60 | A₁ₛ(1) | A₁ₑ(1) | | | |
| | 23:40:61 | A₁ₛ(2) | A₁ₑ(2) | | | |
| 1ST AREA | ...... | | | | | |
| | 23:40:74 | A₁ₛ(15) | A₁ₑ(15) | | | |
| | 23:40:00 | A₁ₛ(16) | A₁ₑ(16) | | | |
| | ...... | | | | | |
| | 23:41:14 | A₁ₛ(30) | A₁ₑ(30) | | | |
| | 23:41:18 | a₁ₛ(1) | a₁ₑ(1) | | | |
| | 23:41:19 | a₁ₛ(2) | a₁ₑ(2) | | | |
| 2ND AREA | ...... | | | | | |
| | 23:41:62 | a₁ₛ(15) | a₁ₑ(15) | | | |
| | 23:41:63 | a₁ₛ(16) | a₁ₑ(16) | | | |
| | ...... | | | | | |
| | 23:42:02 | a₁ₛ(30) | a₁ₑ(30) | | | |

AT₁ : a₁ₛ, a₁ₑ

33₂ — A₂ₛ, A₂ₑ / a₂ₛ, a₂ₑ — AT₂

33₃

| | A₃ₛ | A₃ₑ |
|---|---|---|
| 23:41:15 | A₃ₛ(1) | A₃ₑ(1) |
| 23:41:16 | A₃ₛ(2) | A₃ₑ(2) |
| 23:41:29 | A₃ₛ(15) | A₃ₑ(15) |
| 23:41:30 | A₃ₛ(16) | A₃ₑ(16) |
| 23:41:44 | A₃ₛ(30) | A₃ₑ(30) |
| 23:42:03 | a₃ₛ(1) | a₃ₑ(1) |
| 23:42:04 | a₃ₛ(2) | a₃ₑ(2) |
| 23:42:17 | a₃ₛ(15) | a₃ₑ(15) |
| 23:42:18 | a₃ₛ(16) | a₃ₑ(16) |
| 23:42:32 | a₃ₛ(30) | a₃ₑ(30) |

AT₃

33₄

| | A₄ₛ | A₄ₑ |
|---|---|---|
| 23:41:30 | A₄ₛ(1) | A₄ₑ(1) |
| 23:41:31 | A₄ₛ(2) | A₄ₑ(2) |
| 23:41:44 | A₄ₛ(15) | A₄ₑ(15) |
| 23:41:45 | A₄ₛ(16) | A₄ₑ(16) |
| 23:41:59 | A₄ₛ(30) | A₄ₑ(30) |
| 23:42:18 | a₄ₛ(1) | a₄ₑ(1) |
| 23:42:19 | a₄ₛ(2) | a₄ₑ(2) |
| 23:42:32 | a₄ₛ(15) | a₄ₑ(15) |
| 23:42:33 | a₄ₛ(16) | a₄ₑ(16) |
| 23:42:47 | a₄ₛ(30) | a₄ₑ(30) |

AT₄

33₅ — A₅ₛ, A₅ₑ / a₅ₛ, a₅ₑ — AT₅

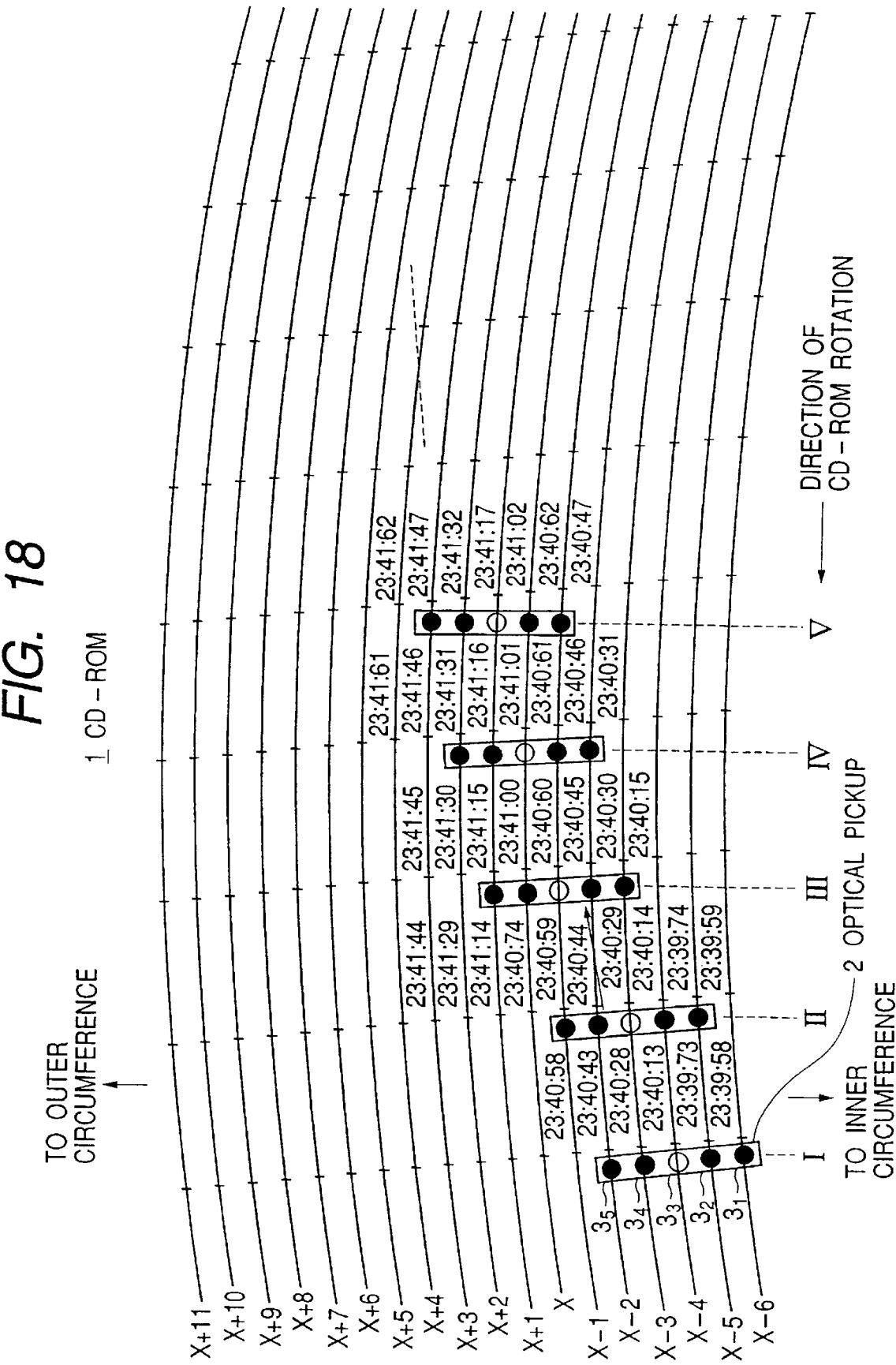

MULTIBEAM OPTICAL DISK READOUT METHOD AND APPARATUS

TECHNICAL FIELD OF THE INVENTION

The present invention relates to an optical disk readout method and optical disk readout system, and in particular, to an optical disk readout method and optical disk readout system configured such that separate light beams simultaneously illuminate each of the multiple adjacent tracks of an optical disk in which tracks are formed in a spiral (e.g. CD-ROM, CD-WO, DVD, DVD-ROM, or DVD-RAM disk), and wherein data recorded in the tracks being illuminated by the beams is read from the detected output of each returned beam by a record data readout system.

RELATED ART

One technique available as a method for reading recorded data from CD-ROM at high speed is the multi-beam technique. This multi-beam technique is disclosed in U.S. Pat. No. 5,457,670 and PCT Gazette WO94/19797 (PCT/US94/01790). In this technique, separate light beams simultaneously illuminate each of the multiple adjacent tracks of an optical disk on which the tracks are formed in a spiral. Data recorded in the tracks illuminated by the beams is simultaneously read-back from the detected output of each returned beam by a record data readout system in a manner such that there will be no duplications or gaps in the data being read back, and such that the data will be output in the sequence in which it was recorded.

Such a multi-beam optical disk (CD-ROM) readout method will be described with reference to FIG. 20. Item 1 is a CD-ROM as seen from the signal side (optical pickup side), on which tracks in which data has been recorded are formed in a spiral with the outside diameter (outer circumference) of the tracks shown at the top of FIG. 20, and the inside diameter (inner circumference) at the bottom. Item 2 is an optical pickup capable of emitting five light beams. When reading, the optical pickup 2 is in a state of relative rotation with respect to the CD-ROM 1, gradually moving from the inside of the disk toward the circumference as it advances, reading the recorded data as proceeds. Now, when the optical pickup 2 arrives at position I and starts reading data, the tracks x through (x+4) are separately illuminated simultaneously by the light beams $3_1$–$3_5$, respectively. The data recorded in each of the tracks illuminated by the beams $3_1$–$3_5$ is simultaneously read from the detected output of each of the returned beams by the prescribed record data readout system, and the data recorded on the CD-ROM 1 is output serially in the sequence in which it was recorded, with no duplications or gaps.

The recorded data of CD-ROM 1 is structured in accordance with a CD signal format in sub-code Q-channel A-time (absolute time) frame units, where one frame=$\frac{1}{75}$ second. Hereinafter, A-times are expressed in the form aa:bb:cc, where aa=seconds, bb=minutes, and cc=frames. If the optical pickup 2 were to start reading data from position I of FIG. 20, then the light beam $3_1$ channel would start reading recorded data correctly from the A-time=23:40:60 portion;

the light beam $3_2$ channel would start reading recorded data correctly from the A-time=23:41:00 portion;

the light beam $3_3$ channel would start reading recorded data correctly from the A-time=23:41:15 portion;

the light beam $3_4$ channel would start reading recorded data correctly from the A-time=23:41:30 portion; and the light beam $3_5$ channel would start reading recorded data correctly from the A-time=23:41:45 portion.

By the time the CD-ROM 1 completes approximately (slightly more than) one revolution, advancing the optical pickup 2 to position II of FIG. 20 (where tracks (x+1)–(x+5) are illuminated by light beams $3_1$–$3_5$ respectively, the light beam $3_1$ channel will have read the recorded data correctly up to A-time=23:40:74;

the light beam $3_2$ channel will have read the recorded data correctly up to A-time=23:41:14;

the light beam $3_3$ channel will have read the recorded data correctly up to A-time=23:41:29; and the light beam $3_4$ channel will have read the recorded data correctly up to A-time=23:41:44;

with the gaps between the data read separately by the light beams $3_1$–$3_5$ now filled. (By this time, light beam $3_5$ will have read the recorded data correctly up to A-time =23:41:59.) The data read by light beams $3_1$–$3_5$ is then output from the system in the sequence in which it was recorded, such that no duplications occur.(No frame is output more than once.)

When the optical pickup 2 has read data as far as position II in FIG. 20, the light pickup 2 is "track-jumped" forward (outward from the center of the CD-ROM 1) by three tracks. This puts the light pickup 2 in position III of FIG. 20 (where light beams $3_1$ through $3_5$ now illuminate tracks (x+4) through (x+8), respectively). At that point, the read operation then begins again, with the light beam $3_1$ channel reading recorded data correctly from the A-time=23:41:48 portion;

the light beam $3_2$ channel reading recorded data correctly from the A-time=23:41:63 portion;

the light beam $3_3$ channel reading recorded data correctly from the A-time=23:42:03 portion;

the light beam $3_4$ channel reading recorded data correctly from the A-time=23:42:18 portion; and the light beam $3_5$ channel reading recorded data correctly from the A-time=23:42:33 portion.

By the time the CD-ROM 1 turns approximately (slightly more than) one revolution, advancing the optical pickup 2 to position IV of FIG. 20 (where tracks (x+5)–(x+9) are illuminated by light beams $3_1$–$3_5$ respectively)

the light beam $3_1$ channel will have read the recorded data correctly up to A-time=23:41:62;

the light beam $3_2$ channel will have read the recorded data correctly up to A-time=23:42:02;

the light beam $3_3$ channel will have read the recorded data correctly up to A-time=23:42:17; and the light beam $3_4$ channel will have read the recorded data correctly up to A-time=23:42:32: and with all gaps between the data read by light beams $3_1$–$3_5$ now closed. (By this time, light beam $3_5$ will have read the recorded data correctly up to A-time=23:42:47.) The data read by light beams $3_1$–$3_5$ is then output from the system in the sequence in which it was recorded, and such that no duplications occur.

As the optical pickup 2 advances from position I to position II (one revolution of the CD-ROM 1), the optical beam $3_5$ channel reads recorded data from A-time 23:41:45 through 23:41:59. As the optical pickup 2 advances from position III to position IV (one revolution of the CD-ROM 1), the optical beam $3_1$ channel reads recorded data from A-time 23:41:48 through 23:41:62. In other words, there is an overlap between A-times 23:41:48 and 23:41:59, which was read by both channels. To avoid outputting these 12 frames twice, the system outputs only the copy of this data that was read by the $3_5$ channel (which read it first) and discards the duplicate data read by channel $3_1$.

Moreover, when the track jump from position II of FIG. 20 is executed, instead of a four-track jump, a three-track jump is executed. Thus the data in track (x+4), which was being read by the light beam $3_1$ channel before the jump, is now illuminated by light beam $3_1$. The reason for doing this is that a four-track jump would have put the optical pickup 2 in position III of FIG. 20. The light beam $3_1$ channel would then have resumed reading recorded data from A-time 23:41:63. This would have left a gap in the data between 23:41:60 and 23:41:62, which had not yet been read by the light beam $3_5$ channel prior to the track jump.

Stated in general terms, for a system with n light beams, where n is an integer of 3 or greater, each light beam channel reads data for approximately one revolution. At that point, a forward track jump of (n−2) tracks is executed, after recorded data is again read for approximately one revolution. This operation repeats continuously to perform high-speed readout of the CD-ROM 1.

Due to factors such as track pitch variance, surface flutter, and eccentric wobble of the CD-ROM 1, however, some of the recorded data may not be readable by the light beam circuits. Consider a disk readout system such as the prior art method described above, where n light beam channels read approximately one revolution-worth of data, then a forward track jump of (n−2) tracks is executed, after which approximately one revolution of recorded data is again read, and this operation is repeated. In this method, for the case illustrated in FIG. 20, if the recorded data in the light beam channel $3_2$, for example, became unreadable during the approximately one revolution of optical pickup 2 reading from the position I of FIG. 20, the data from A-time 23:41:00 through 23:41:14 would be lost.

When the optical pickup 2 reaches position II, it jumps three tracks to position III; therefore, this data between A-time=23:41:00 and A-time=23:41:14 is never read. Next, as the recorded data read continues for approximately one revolution from position III, the recorded data between A-time=23:41:63 and A-time=23:42:02 fails to be read.

In this method, then, there was a problem in that some data required by the user could not be retrieved.

In consideration of the above problem of the prior art, it is an object of the present invention to provide an optical disk readout method and optical disk readout system in which, even if recorded data cannot be read by some of the light beams, the required data can still be obtained.

It is also an object of the present invention to provide an optical disk readout method and optical disk readout system capable of reading data from an optical disk more efficiently.

SUMMARY OF THE INVENTION

In an optical disk readout method according to the present invention, n adjacent tracks (n being an integer of 3 or greater) of an optical disk are illuminated simultaneously by separate n light beams arranged in the radial direction of the optical disk in order to read recorded data in the tracks illuminated by the n light beams, from output obtained by detecting returned ones of the n light beams through n light beam-read channels, and the reading of the optical disk is performed by alternating between a continuous reading and a track jump in the forward direction.

The method is characterized by steps of detecting the alignment status in the radial direction for the light beam-read channels incapable of reading recorded data from the optical disk; designating of light beam-read channels to be used for reading and determining the number of tracks to be jumped, according to the detection for the alignment status in the radial direction of the capable light beam-read channels; storing the readout data and corresponding frame addresses of the optical disk during the continuous reading by the light beam-read channels designated for reading; and executing the track jump by the determined number of tracks when the stored corresponding frame addresses become successive for data from the designated light beam-read channels during the continuous reading.

In the embodiment, when detecting that one or adjacent two light beam-read channels only are capable of reading the recorded data, a single light beam-read channel is designated for reading and the continuous reading is successively conducted without executing the track jump.

M is the number of beams in the most populous contiguous group of light beam-read channels from which data can be read, said M light beam-read channels are designated as the valid ones, and the optical disk is read by alternating between performing continuous reading through said M designated valid light beam-read channels, for approximately one revolution of the optical disk, and executing a track jump of (M−2) tracks in the forward direction.

If Q is the distance, in number of tracks, between the innermost and outermost beams of light beam-read channels capable of reading recorded data, R is the number of beams in the most populous contiguous group of light beam-read channel incapable of reading recorded data, whose beams lie between said innermost and outermost light beams, and also if Q is at least 2, and R is at least 1, then the optical disk is read by alternating between performing continuous reading of the optical disk through the light beam-read channels that are capable of reading recorded data for approximately (R+1) revolutions of the optical disk, and executing a track jump of (Q−1) tracks in the forward direction.

When (Q−1) is equal or less than zero, a single light beam-read channel only is designated for reading and the continuous reading is successively performed without executing the track jump.

In an optical disk readout apparatus according to the present invention, n adjacent tracks (n being an integer of 3 or greater) of an optical disk are illuminated simultaneously by separate n light beams arranged in the radial direction of the optical disk, comprising optical detection means for reading recorded data in the tracks illuminated by the n light beams, from output obtained by detecting returned ones of the n light beams through n light beam-read channels, and readout control means for reading the optical disk by alternating between a continuous reading and a track jump in the forward direction.

The apparatus is characterized by means for detecting the alignment status in the radial direction for the light beam-read channels incapable of reading recorded data from the optical disk; means for designating of light beam-read channels to be used for reading and for determining the number of tracks to be jumped, according to the detection for the alignment status in the radial direction of the capable light beam-read channels; and means for storing the readout data and corresponding frame addresses of the optical disk during the continuous reading by the light beam-read channels designated for reading; wherein the readout control means executes the track jump by the determined number of tracks when the stored corresponding frame addresses become successive for data from the designated light beam-read channels during the continuous reading.

BRIEF DESCRIPTION OF THE DRAWINGS

FIG. 5 shows an example of the contents of the memories of FIG. 2.

FIG. 7 shows an example of the contents of the memories of FIG. 2.

FIG. 13 shows an example of the contents of the memories of FIG. 2.

FIG. 18 shows an example of a data read operation in the CD-ROM readout system of FIG. 1.

DETAILED DESCRIPTION OF EMBODIMENTS

Figure 1:
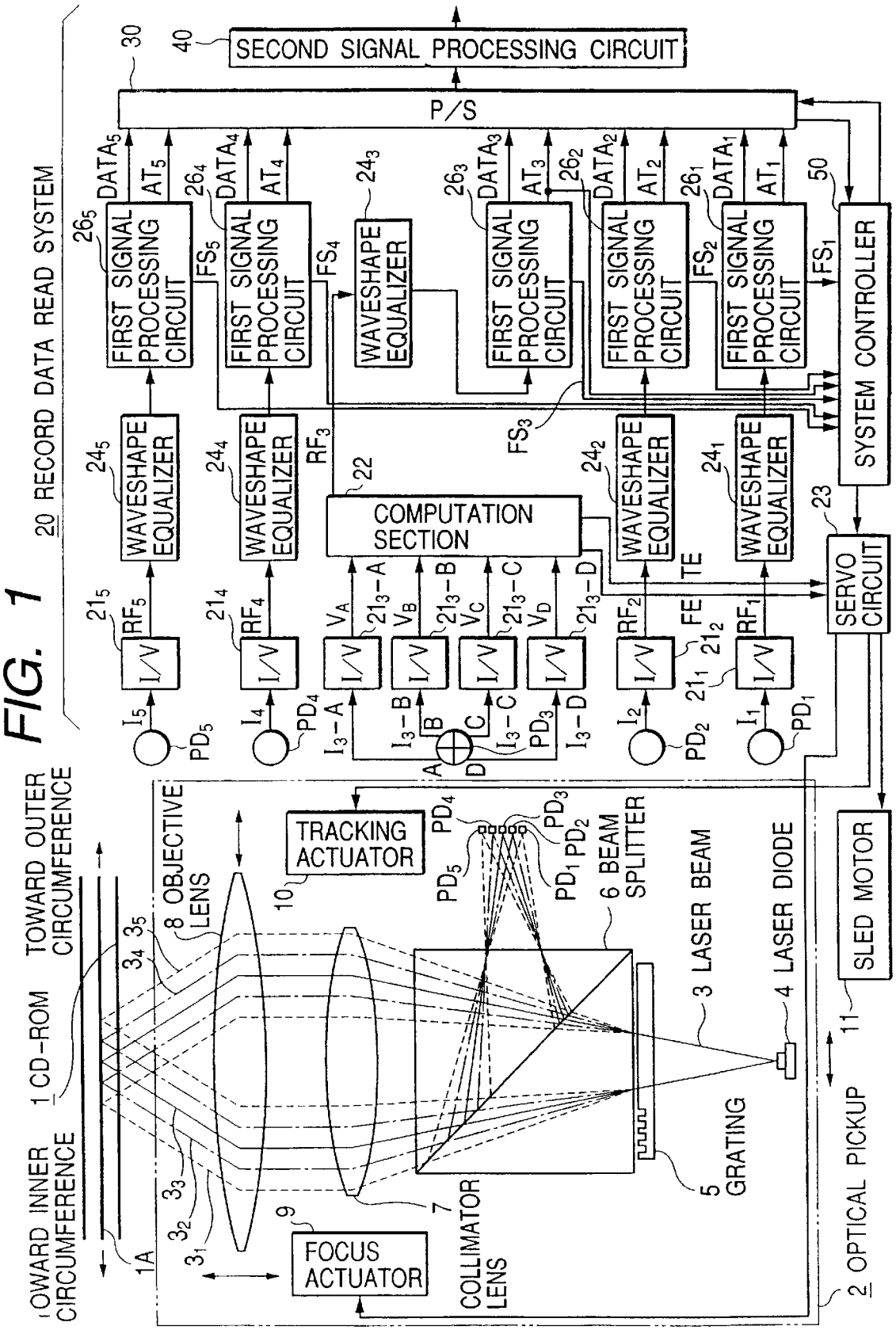
FIG. 1 is a block diagram of a CD-ROM readout system in which a first embodiment of the optical disk readout method and optical disk readout system of the present invention is embodied.
Figure 20:
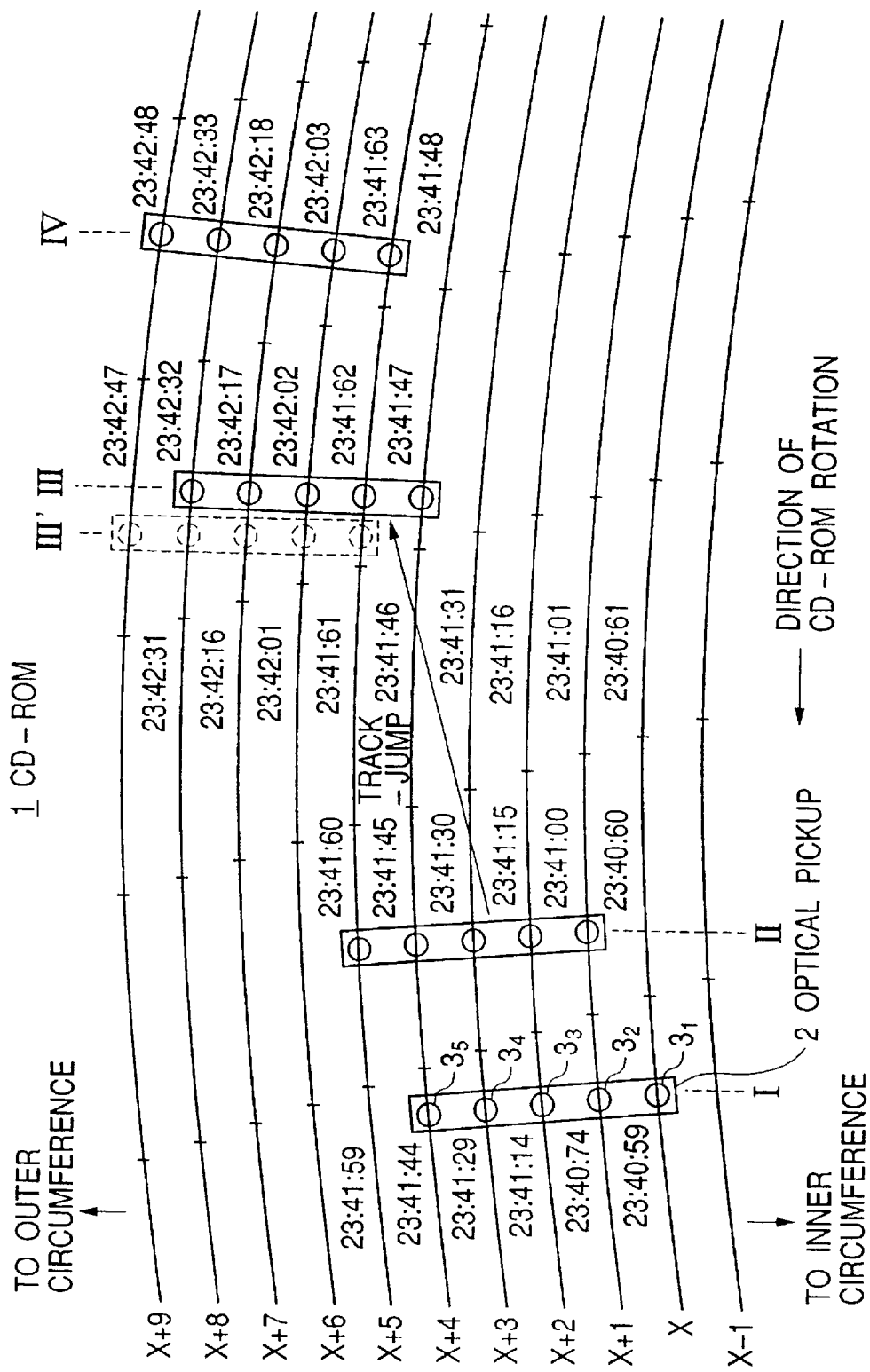
FIG. 20 is a drawing to explain the multi-beam optical disk readout technique.

An embodiment of the invention will be described with reference to FIG. 1. FIG. 1 is a block diagram of a CD-ROM readout system for implementing the optical disk readout method of the present invention. Items in FIG. 1 that are the same as items in FIG. 20 bear the same reference numbers.

In FIG. 1, item 1 is a CD-ROM, on which tracks on which data is recorded are formed in a spiral (the left side in FIG. 1 corresponding to the inside of the disk, and the right side in FIG. 1 corresponding to its outer edge). A spindle motor (not illustrated) spins the CD-ROM 1 at constant linear velocity. Item 2 is a multibeam optical pickup that simultaneously illuminates each of n=5 adjacent tracks of the CD-ROM 1 with the separate light beams $3_1$–$3_5$. The intercepted light of the returned beam is detected (received) by individual photodetectors $PD_1$–$PD_5$, which output photoelectric currents as detected signals.

Within the optical pickup 2 are a laser diode 4 that emits a laser beam 3;

a diffraction grating 5, which is placed perpendicular to the optical axis of the laser diode 4, to form the following light beams:
  a light beam $3_1$, of −2nd order diffracted light,
  light beam $3_2$, o −1st order diffracted light,
  light beam $3_3$, of 0th order diffracted light,
  light beam $3_4$, of +1st order diffracted light, and
  light beam $3_5$, of +2nd order diffracted light, a beam splitter 6, made of two rectangular prisms, pasted together;

a collimator lens 7 that collimates the diverging light to form parallel light rays;

an objective lens 8 that focuses the light beams $3_1$–$3_5$ that have passed through beam splitter 6 and the collimator lens 7 onto the signal surface 1A of the CD-ROM 1, a focus actuator 9, for moving the objective lens 8 in a direction perpendicular to the CD-ROM 1 so as to follow the surface flutter thereof, to thereby keep the light beams $3_1$–$3_5$ in focus at the signal surface 1A, regardless of surface flutter of the CD-ROM 1;

a tracking actuator 10, which moves the objective lens 8 radially with respect to the CD-ROM 1 so as to follow the eccentric wobble thereof such that the beams $3_1$–$3_5$ will properly trace their tracks, regardless of the eccentric wobble of the CD-ROM 1. Focus actuator 9 and tracking actuator 10 are separately driven by a servo circuit, to be discussed later.

Each of the separate photodetectors $PD_1$–$PD_5$, provided to detect light beams $3_1$–$3_5$, respectively, output photoelectric currents proportional to the amount of received light. The returned beams of the light beams $3_1$–$3_5$, having been reflected from the signal surface 1A of the CD-ROM 1, pass through the objective lens 8 and collimator lens 7, are reflected by the beam splitter 6, and pass through optics (cylindrical and detector lenses, etc, that are not shown in the drawing), to become separately incident to the photodetectors $PD_1$–$PD_5$. The photodetectors $PD_1$, $PD_2$, $PD_4$, and $PD_5$ output photoelectric currents $I_1$, $I_2$, $I_4$, and $I_5$ proportional to the amount of light received, as the detected signals of the returned beams of the light beams $3_1$, $3_2$, $3_4$, and $3_5$. The photodetector $PD_3$ is a quarter-split photodiode of the type used in common single-beam optical pickups. The four diode quadrants A, B, C, and D of photodetector $PD_3$ output the photoelectric currents $I_3$-A, $I_3$-B, $I_3$-C, and $I_3$-D, respectively, proportional to the amount of light received.

During search of readout, a sled motor 11 moves the optical pickup 2 in the radial direction of the CD-ROM 1. During search, this sled motor 11 is driven by a servo circuit to move the optical pickup 2 in either the forward or reverse direction to position it in a desired location. During readout, it moves the optical pickup 2 gradually in the forward direction as the reading of CD-ROM 1 proceeds.

From the outputs of the photodetectors $PD_1$–$PD_5$, of the optical pickup 2, a recorded data readout system 20 simultaneously reads the data that is recorded in the tracks being illuminated by light beams $3_1$–$3_5$, and outputs the CD-ROM 1 recorded data in serial form, in the sequence in which it was recorded, with no duplications or gaps in the data. Within this recorded data readout system 20, current-to-voltage (I/V) converters $21_1$, $21_2$, $21_4$ and $21_5$ convert the photoelectric currents $I_1$, $I_2$, $I_4$ and $I_5$ output by the photodetectors $PD_1$, $PD_2$, $PD_4$ and $PD_5$, respectively, to voltages, which are output as the RF signals $RF_1$, $RF_2$, $RF_4$ and $RF_5$, corresponding to the light beams $3_1$, $3_2$, $3_4$ and $3_5$. The current-to-voltage (I/V) converters $21_3$-A, $21_3$-B, $21_3$-C, and $21_3$-D convert the photoelectric currents $I_3$-A, $I_3$-B, $I_3$-C and $I_3$-D output by the photodetector $PD_3$, to voltages, which it outputs as the voltage values $V_A$, $V_B$, $V_C$, and $V_D$.

The computation section 22 performs the computation $(V_A+V_B+V_C+V_D)$, to output an RF signal $RF_3$ corresponding to light beam $3_3$, performs the computation $(V_A+V_C)-(V_B+V_D)$ to output the focus error signal FE, and the performs computation $(V_A+V_B)-(V_C+V_D)$ to output the tracking error signal TE. The servo circuit 23 performs focus servo control, tracking servo control, and sled servo control: It drives the focus actuator 9, based on the focus error signal FE, so as to reduce the focus error to zero, to thereby focus the light beams $3_1-3_5$ at the signal surface 1A; and drives the tracking actuator 10, based on the tracking error signal TE, so as to reduce the tracking error signal to zero, to thereby keep the light beams $3_1-3_5$ on their respective tracks.

Waveshape equalization circuits $24_1-24_5$ modify the waveshapes of the RF signals $RF_1-RF_5$ to enhance their high frequency components to compensate for high band attenuation due to the modulation transfer functions (MTF) of light beams $3_1-3_5$, and suppress intersymbol interference. Also, either the RF signal $RF_3$, input to waveshape equalization circuit $24_3$, or the [waveshape-equalized version of the] RF signal $RF_3$, output from waveshape equalization circuit $24_3$, is input to the servo circuit 23 (not shown in FIG. 2). When turning on the focus servo, the servo circuit 23 activates a focus search operation, timing the focus servo turn-on point to occur while the value of the focus error signal FE is in the negative feedback region of the focus servo loop. Also, when turning the tracking servo on, [the servo circuit 23] uses the RF signal $RF_3$ to time the tracking servo turn-on point to occur with the light beam $3_3$ in the negative feedback region of the tracking servo loop.

The RF signals $RF_1-RF_5$ are input to the "first signal processing circuits" $26_1-26_5$, respectively, where digitization, clock extraction (using a PLL), bit demodulation, frame sync detection, EFM demodulation, and subcode demodulation processes are performed. The EFM demodulated data signals $DATA_1-DATA_5$ (which include P and Q parity) are output along with their corresponding subcode Q-channel A-time data signals $AT_1-AT_5$, $DATA_1-DATA_5$ are output in blocks (98-frame units concluding with one subcode frame). The first signal processing circuits $26_1-26_5$ output the demodulated data signals $DATA_1-DATA_5$, one symbol (8 bits) at a time. When the first signal processing circuits $26_1-26_5$ detect frame sync, they output the "frame sync detect" signals $FS_1-FS_5$, respectively, as a HIGH level, to a system controller, to be described later. The system controller uses these frame sync detect signals $FS_1-FS_5$ to determine separately for each of the light beam $3_1-3_5$ channels, whether data can or cannot be read from the channel. The first signal processing circuit 263 also sends the $AT_3$ A-time data signal to the system controller. The first signal processing circuit $26_3$, the signal processing circuit for the $RF_3$ RF signal channel has an internal CLV control circuit (not illustrated), the purpose of which is to cause the frame sync signal to be detected at constant time intervals, performing CLV control for a spindle motor drive circuit (not illustrated) to cause the CD-ROM 1 to spin at constant linear velocity.

Figure 2:
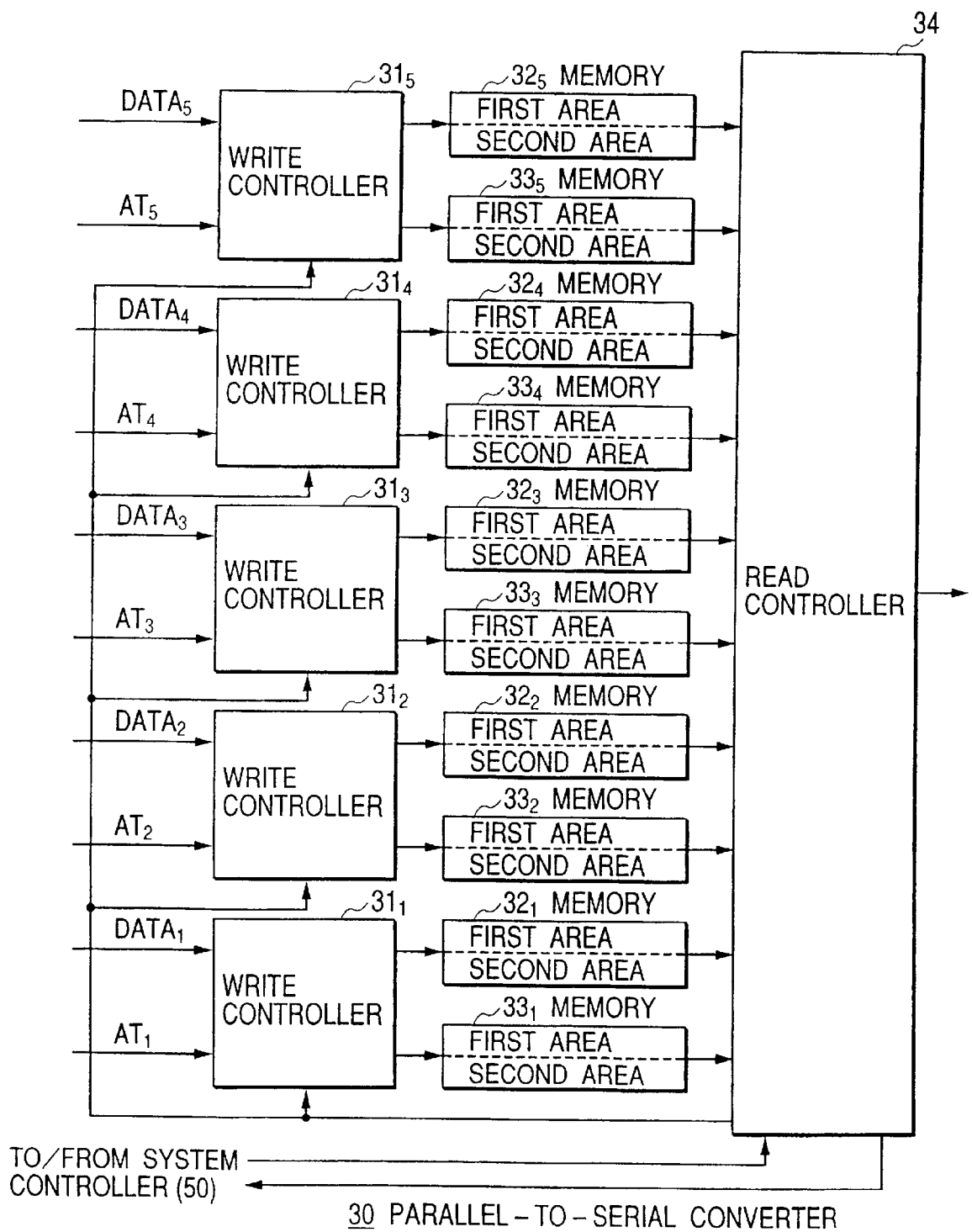
FIG. 2 is a block diagram of the parallel-to-serial converter of FIG. 1.

Parallel-to-serial (P/S) converter 30 inputs the 8-bit parallel data output by each of the first signal processing circuits $26_1-26_5$ one block at time. The P/S converter 30 converts the parallel data to serial data, ensures that there are no duplications or gaps in the data, and outputs it, in the order in which it was recorded, as serial data. FIG. 2 is a block diagram showing a specific configuration for this parallel-to-serial converter 30. In FIG. 2, one of each of the memory circuits $32_1-32_5$ is provided for the corresponding one of the first signal processing circuits $26_1-26_5$. Each memory circuit has two memory areas: a first area and a second area. The $DATA_3-DATA_5$ data output from first signal processing circuits $26_1-26_5$, is stored in one or the other of the two storage areas [of the associated memory circuit]. The first and second areas have sufficient storage capacity to store the required number of blocks of $DATA_1-DATA_5$ data. One of each of the memory circuits $33_1-33_5$ is also provided for each of the first signal processing circuits $26_1-26_5$, respectively. Each of these memory circuit also has a first area and second area. The $AT_1-AT_5$ A-time data output from first signal processing circuits $26_1-26_5$, is stored in one or the other of these areas, along with the start address $A_{1s}-A_{5s}$ (or $a_{1s}-a_{5s}$) and end address $A_{1e}-A_{5e}$ (or $a_{1e}-a_{5e}$), marking the memory locations of the $DATA_1-DATA_5$ data stored in the corresponding $32_1-32_5$ memories. The first and second areas have sufficient storage capacity to store [the required] number of [sets of] $AT_1-AT_5$ A-time data.

One of the five write controllers $31_1-31_5$ is provided for the corresponding one of the first signal processing circuits $26_1-26_5$. The write controllers write the $DATA_1-DATA_5$ data output from first signal processing circuits $26_1-26_5$ into the first or second areas of memory circuits $32_1-32_5$, and write the $AT_1-AT_5$ A-time data, along with the start address $A_{1s}-A_{5s}$ (or $a_{1s}-a_{5s}$) and end address $A_{1e}-A_{5e}$ (or $a_{1e}-a_{5e}$), marking the memory locations of the $DATA_1-DATA_5$ data stored in the corresponding $32_1-32_5$ memories, in the first or second areas of memories $33_1-33_5$.

Figure 3:
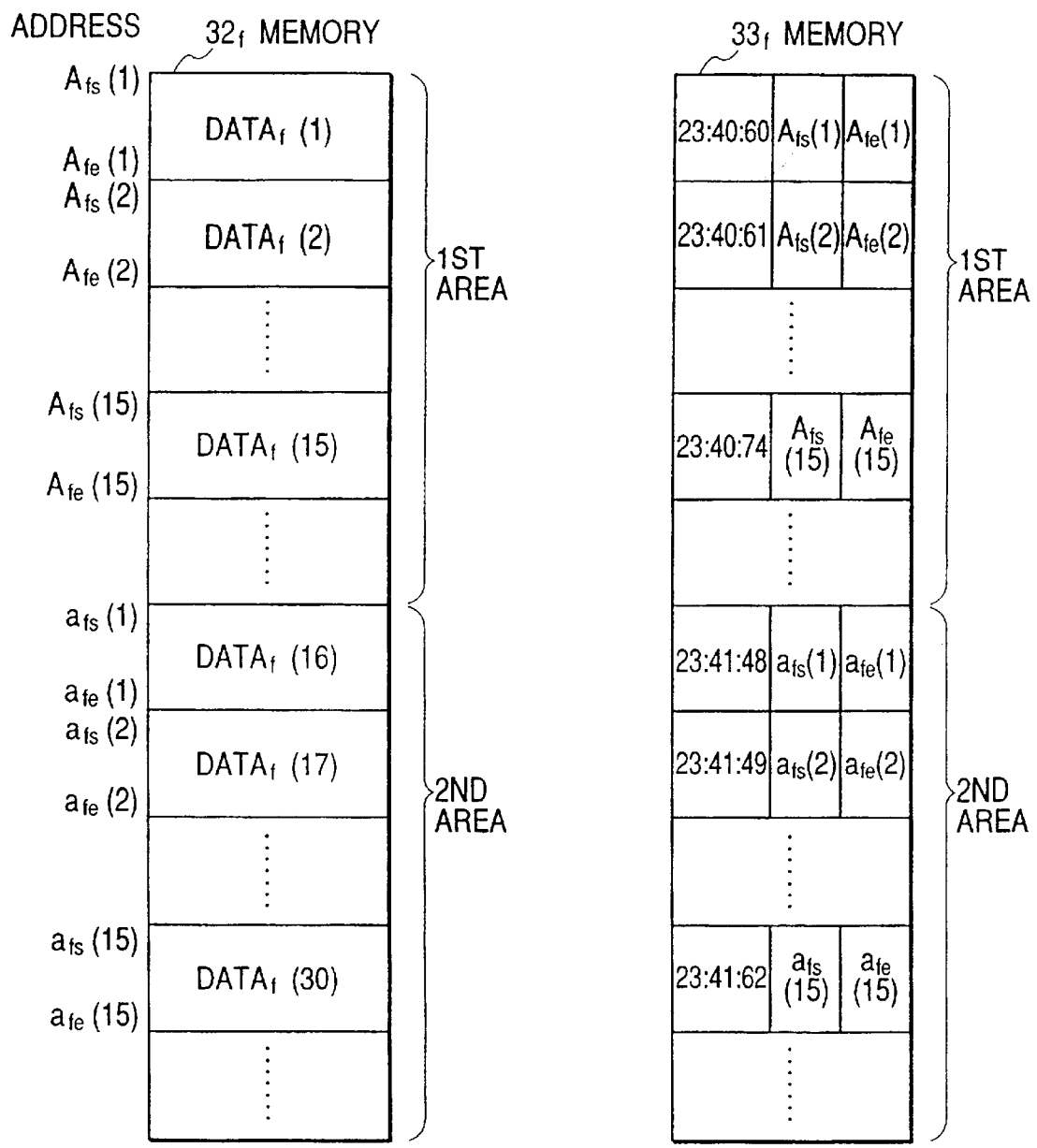
FIG. 3 shows an example of the contents of the memories of FIG. 2.

If, for example, the write controller $32_f$ (where f=1–5) writes the 15 blocks of data $DATA_f(1)-DATA_f(15)$ to the first area, and the 15 blocks $DATA_f(16)-DATA_f(30)$ to the second area of memory $32_f$, then the contents of memories $32_f$ and $33_f$ will be as shown in FIG. 3. That is, written to the first area of memory $33_f$ is the A-time data for each block of $DATA_f(1)-DATA_f(15)$ (e.g. 23:40:60–23:40:74), and the start address $A_{fs}(1)$ and end address $A_{fe}(1)$ through start address $A_{fs}(15)$ and end address $A_{fe}(15)$, which indicate the storage locations in the first area of memory $32_f$ of $DATA_f(1)-DATA_f(15)$. Written to the second area of memory $33_f$ are the A-time data for each block of $DATA_f(16)-DATA_f(30)$ (e.g. 23:41:48 to 23:41:62), and the start address $a_{fs}(1)$ and end address $a_{fe}(1)$ through start address $a_{fs}(15)$ and end address $a_{fe}(15)$, which indicate the storage locations in the second area of memory $32_f$ of $DATA_f(16)-DATA_f(30)$.

Read controller 34 accesses the A-time data $AT_1-AT_5$ stored in memories $33_1-33_5$ at the start addresses $A_{1s}-A_{5s}$ (or $a_{1s}-a_{5a}$) and end addresses $A_{1e}-A_{5e}$ (or $a_{1e}-a_{5e}$), to read out the $DATA_1-DATA_5$ data stored in memories $32_1-32_5$, without duplication or gaps, and in the same sequence as it was recorded on CD-ROM (i.e., A-time sequence), and output it serially, a symbol at a time. The operation of the write controllers $31_1-31_5$ and the read controller 34 will be described in more specific terms later.

Returning now to FIG. 1, second signal processing circuit 40 inputs the serial data output by parallel-to-serial converter 30. After descrambling this data a block at a time, it performs error detection/correction based on CIRC code (P parity error detection/correction, de-interleaving, and Q parity error detection/correction). It then demodulates L and R channel data in accordance with the CD-DA standard; and from the resulting L and R channel data, performs additional sync detection, descrambling, header detection, and EDC and ECC code error correction, in order to demodulate the CD-ROM data and output it to an external host computer.

A microcontroller circuit is used for the system controller 50. In search operation, it issues a search command to servo circuit 23, which responds by applying drive to sled motor 11 as required to move the optical pickup 2 in either the forward or reverse direction of the CD-ROM 1 to position it in the desired location. During read operations, the system controller 50 issues "servo on" commands as required to focus the light beam $3_1$–$3_5$ spots at the signal surface 1A, and to keep the beams "on-track" (autotrack locked) on five adjacent tracks of the CD-ROM 1. Also, after reading the data recorded 4n these tracks for an appropriate number of revolutions of the disk (at least one or two), a "track jump" command is issued to jump [the sled] forward a prescribed number of tracks.

At the start of each read operation, for one revolution of the CD-ROM 1, the system controller 50 monitors the states of the frame sync detect signals $FS_1$–$FS_5$ received from the first signal processing circuits $26_1$–$26_5$, to determine whether the data from any of the $3_1$–$3_5$ light beam channels is unreadable (due to CD-ROM 1 track pitch variance, disk flutter, wobble, etc.). If all of the frame sync detect signals $FS_1$–$FS_5$ are HIGH (i.e., if there are no unreadable channels) the controller sends a normal write/read command to parallel-to-serial converter 30, to write/read the $DATA_1$–$DATA_5$ data outputs of all of the first signal processing circuits $26_1$–$26_5$ to/from memory ($32_1$–$32_5$).

However, if one or more of the light beam channel frame sync detect signals $FS_1$–$FS_5$ stays LOW for a set minimum time (e.g., 1/75 second), indicating that the data in that channel (or channels) is unreadable, those light beams (from among the beams $3_1$–$3_5$) that are to be used for reading data are determined (these light beams will be designated $3_i$, $3_j$, $3_k$ . . . ), and special write/read commands, which contain information as to the light beam channels to be used for reading data (i, j, k, . . . ), are sent to the serial-to-parallel converter 30. The data outputs of those of the first signal processing circuits $26_1$–$26_5$, that are in the channels being used to read the data outputs (the $DATA_i$, $DATA_j$, $DATA_k$, . . . outputs of first signal processing circuits $26_i$, $26_j$, $26_k$, . . . ) are then written to and read from the memory circuits $32_1$–$32_5$.

These "normal" and "special" read/write commands output by the system controller 50 are input to the read controller 34 of parallel-to-serial converter 30, and are also passed on from the read controller 34 to the write controllers $31_1$–$31_5$. At the start of a read operation, if the write controllers $31_1$–$31_5$ receive a normal write/read command, they first write the $DATA_1$–$DATA_5$ data outputs of all of the first signal processing circuits $26_1$–$26_5$ to the first areas of the memories $32_1$–$32_5$, respectively. When a "stop" command is received from the read controller 34, the write controllers stop writing, and next, when a resume command is received, they write to the second area (the area other than the one they wrote to last time). After that, when the controllers receive a halt command followed by a resume command, they stop writing, and when they resume, they write to the area (first or second) other than the one they were writing to when they received the halt command.

At the start of a read operation, if the write. controllers $31_1$–$31_5$ receive a special write/read command, however, only those write controllers of the readable channels identified by the special write command write the data outputs of the first signal processing circuits for those channels to the first areas of the applicable memory circuits for those channels. That is, if the readable channels are i, j, and k, . . . the write controllers $31_i$, $31_j$, $31_k$, . . . write the $DATA_i$, $DATA_j$, $DATA_k$ outputs of the first signal processing circuits $26_i$, $26_j$, $26_k$, . . . to the first areas of the $32_i$, $32_j$, $32_k$, . . . memories. When the halt command is received from the read controller 34, the write controllers stop writing, and next, when a "resume" command is received, they write to the second area (the area other than the one they wrote to last time). After that, the operation proceeds in the same manner: when the controllers receive a halt command, they stop writing; and when they receive a resume command, they write to the area (first or second) other than the one they wrote to the previous time.

When the read controller 34 receives a normal write/read command (special write/read command) from the system controller 50, if a "stop" command is sent to the write controllers $31_1$–$31_5$ ($31_i$, $31_j$, $31_k$ . . . ), when the A-times indicated by the A-time data stored in those areas (first or second) of the memories $33_1$–$33_5$ ($33_i$, $33_j$, $33_k$, . . . ) that were written to during this operation by the write controllers $31_1$–$31_5$ ($31_i$, $31_j$, $31_k$, . . . ) are all consecutive times, with no gaps, a track-jump command is sent to the system controller 50, and the read controller 34 itself then accesses the A-time data and the start and end addresses stored in the areas (first or second) of memories $33_1$–$33_5$ ($33_i$, $33_j$, $33_k$) that were written to this time, and reads out the corresponding recorded data stored in those areas (first or second) of memories $32_1$–$32_5$ ($32_i$, $32_j$, $32_k$, . . . ) that were written to this time, outputting the data in A-time sequence, starting with the data corresponding to the most recent A-time.

Later, when the "jump completed" notification input is received from the system controller 50, a resume command is sent to the write controllers $31_1$–$31_5$ ($31_i$, $31_j$, $3_k$, . . . ). This time, when the A-times, as indicated by the A-time data written to those areas (first or second) of the memories $33_1$–$33_5$ ($33_i$, $33_j$, $33_k$, . . . ) other than the ones written to the previous time are all consecutive A-times, without gaps, the read controller 34 itself sends a halt command to the write controllers $31_1$–$31_5$ ($31_i$, $31_j$, $31_k$), and sends a jump command to the system controller 50. The read controller 34 also accesses the A-time data and the start and end addresses stored in those areas (first or second) of memories $33_1$–$33_5$ ($33_i$, $33_j$, $33_k$) other than the ones written to last time, and reads out the corresponding recorded data stored in the areas (first or second) of memories $32_1$–$32_5$ ($32_i$, $32_j$, $32_k$) other than the ones written to the previous time, outputting the data in A-time sequence, starting with the data corresponding to the A-time immediately following the A-time for to the last block of data output to the second signal processing circuit 40. From that point on, the process repeats.

Next, the operation of the above embodiment will be described, with reference to FIGS. 4 through 18. For this description, it is assumed that the CD-ROM 1 is already spinning at constant linear velocity under CLV control, and that the focus servo is on. It is also assumed that the optical pickup 2 is simultaneously illuminating five adjacent tracks of the CD-ROM 1 separately with n=5 light beams $3_1$–$3_5$.

(1) Identifying Unreadable Channels

The host computer (not illustrated) generates an input to the system controller 50 to specify a "read start point" on the CD-ROM 1, in A-time (e.g. 23:41:00). For this discussion, the track that includes this read start point shall be designated "track x" (see FIGS. 4, 6, 8, 10, 11, 12, 14, 15, 16, and 18). In response to this input, the system controller 50 first sends a "search" command to servo circuit 23. This causes optical pickup 2 to be moved so as to position beam 31 at track (x–6). Then, "tracking servo on" and "sled servo on" commands are sent to the servo circuit 23 to activate the tracking and sled search functions. This results in beams $3_1$ through $3_5$ that are being emitted from optical pickup 2 being focused and on-track on tracks (x–6) through (x–2) (position I in FIGS. 4, 6, 8, 10, 11, 12, 14, 15, 16, and 18).

The beams $3_1$–$3_5$ are reflected by the signal surface 1A, and the returned beams intercepted by the photodetectors $PD_1$–$PD_5$, which output photoelectric currents $I_1$–$I_5$. The photoelectric currents $I_1$, $I_2$, $I_4$ and $I_5$, output by the photodetectors $PD_1$, $PD_2$, $PD_4$ and $PD_5$ are converted to RF signals $RF_1$, $RF_2$, $RF_4$ and $RF_5$ by the I/V converters $21_1$, $21_2$, $21_4$ and $21_5$. After waveshaping by waveshape equalization circuits $24_1$, $24_2$, $24_4$, and $24_5$, these RF signals are input to the first signal processing circuits $26_1$, $26_2$, $26_4$ and $26_5$. The photoelectric currents $I_3$-A–$I_3$-D from photodetector $PD_3$ are converted to the voltage values $V_A$–$V_D$ by the I/V converters $21_3$-A–$21_3$-D, which are summed in the computation section 22 to generate the RF signal $RF_3$. After waveshaping by the waveshape equalization circuit $24_3$, this signal is input to the first signal processing circuit $26_3$.

The RF signals $RF_1$–$RF_5$ are input to the "first signal processing circuits" $26_1$–$26_5$, respectively, where digitization, clock extraction (using a PLL), bit demodulation, frame sync detection, EFM demodulation, and subcode demodulation are performed. The EFM demodulated data signals $DATA_1$–$DATA_5$ (which include P and Q parity) are output along with their corresponding subcode Q-channel A-time data signals $AT_1$–$AT_5$. $DATA_1$–$DATA_5$, are output in block units. The first signal processing circuits $26_1$–$26_5$ output the demodulated data signals $DATA_1$–$DATA_5$, one symbol (8 bits) at a time. When the first signal processing circuits $26_1$–$26_5$ detect frame sync, they output the "frame sync detect" signals $FS_1$–$FS_5$, respectively, as a HIGH level to the system controller 50.

After executing a search operation to put the light beams $3_1$–$3_5$ of optical pickup 2 on-track, at tracks (x–6) through (x–2), the system controller 50 monitors the frame sync detect signals $FS_1$–$FS_5$ received from the first signal processors $26_1$–$26_5$. The decision as to whether the data from a particular channels is readable is made as follows: If, during one revolution of the CD-ROM 1, a frame sync signal stays LOW for at least one block (for our purposes, 1/75 seconds), it is determined that data from that channel is unreadable.

Figure 4:
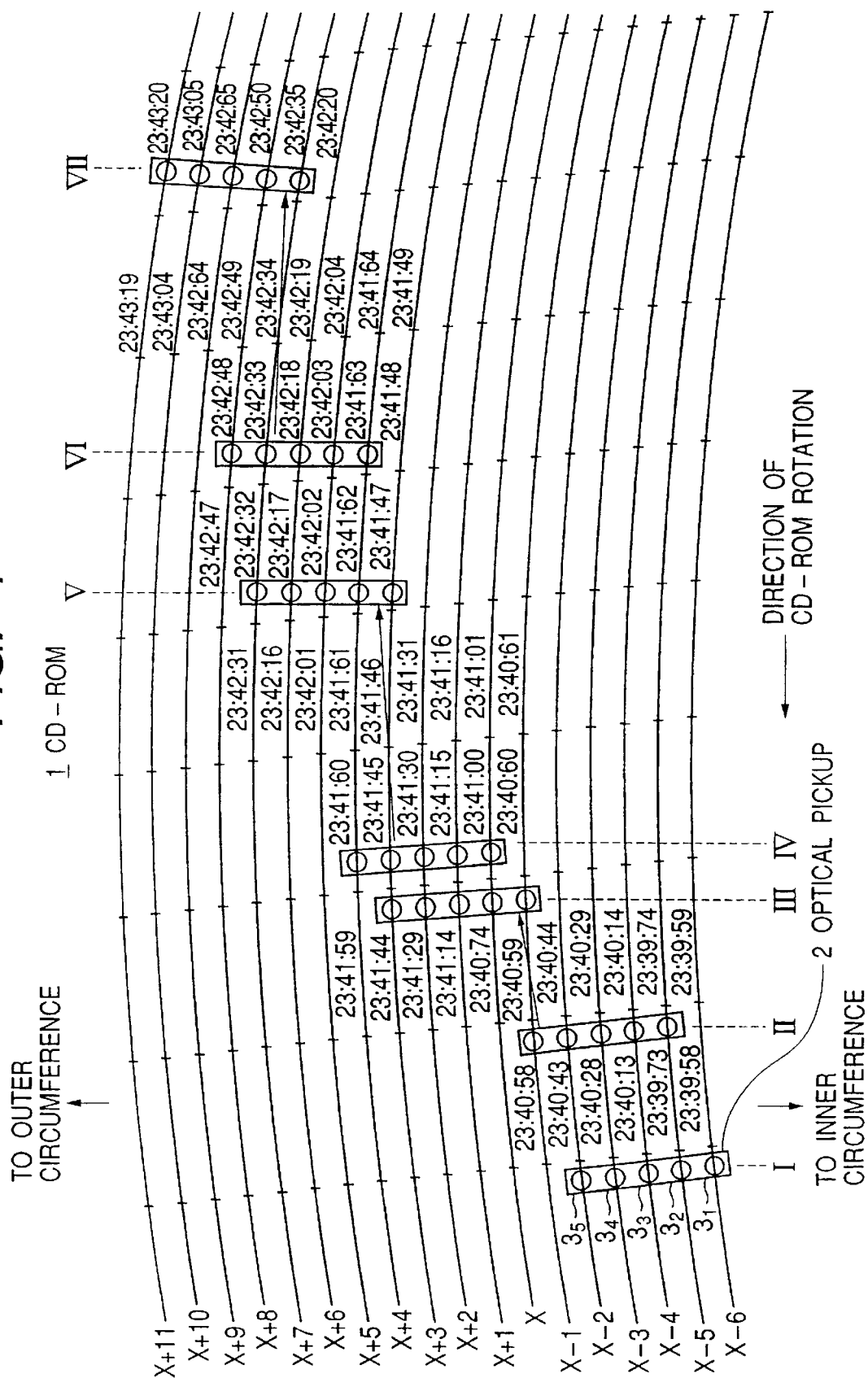
FIG. 4 shows an example of a data read operation in the CD-ROM readout system of FIG. 1.

(2) Normal Write/Read Operation (FIGS. 4 and 5)

First operation will be explained for the case in which the recorded data is readable in all five of the light beam channels ($3_1$–$3_5$).

When it is determined, as described above, that there are no unreadable channels, all five light beam channels ($3_1$–$3_5$) are allocated to h (the number of "valid" beam (or channels), i.e., beams to be used for reading data. Also, the values "I" and "J" are set to I=1, and J=(n–2)=3, where I is the number of disk revolutions in a Continuous data read (without track-jumping), J is the number of tracks jumped in a track jump, and n is the total number of beams (five in this case). Also, from the newest (latest) A-time in the A-time data $AT_3$ input from the first signal processing circuit $26_3$, and the A-time of the "read start point" specified by the host computer, [the system controller 50] determines the jump direction and number of tracks for a track jump that will put beam $3_1$, the innermost of the h=5 valid beams (the beam nearest the center of the disk), on-track, one track inside of track "x," the track that includes the A-time of the read start point (i.e., the jump that will put $3_1$ on track at track (x–1)) and executes that track jump.

With the h valid light beam channels allocated, and the values of I (the number of disk revolutions in a continuous data read) and J (the number of tracks jumped in a track jump) set, if the optical pickup 2 is located at position II of FIG. 4, it will be jumped forward from position II by four tracks, to put beams $3_1$–$3_5$ on-track at tracks (x–1)–(x+3) (position III in FIG. 4). Simultaneous reading of the recorded data in tracks (x–1) through (x+3) begins at that point through the five channels (circuits) made up of photodetector $PD_1$ through first signal processing circuit $26_1$, photodetector $PD_2$ through first signal processing circuit $26_2$, photodetector $PD_3$ through first signal processing circuit $26_3$, photodetector $PD_4$ through first signal processing circuit $26_4$, and photodetector $PD_5$ through first signal processing circuit $26_5$. Also, when HIGH level frame sync detect signals $FS_1$–$FS_5$ are received from all five of the first signal processing circuits $26_1$–$26_5$, a "normal write/read" command is sent to parallel-to-serial converter 30.

The normal write/read command is fed through read controller 34 to the write controllers $31_1$–$31_5$, which then write the data $DATA_1$–$DATA_5$, received from first signal processor circuits $26_1$–$26_5$, respectively, a block at a time, to the first areas of the memories $26_1$–$26_5$, in sequence [(the sequence in which it was recorded)]. The write controllers also write the A-time data corresponding to the above data to memory, along with the memory addresses at which that data is located, as follows: Referring to FIG. 3, $AT_1$–$AT_5$ (the A-time data Ad or $DATA_1$–$DATA_5$) is written to the first areas of memories $33_1$–$33_5$, along with the memory $32_1$–$32_5$ start/end address pairs (start addresses $A_{1s}$–$A_{5s}$ and end addresses $A_{1e}$–$A_{5e}$) at which the corresponding data is stored. For the case illustrated in FIG. 4, the data written as A-time data in the first areas of each of the memories $33_1$–$33_5$, would be 23:40:60, 23:41:00, 23:41:15, 23:41:30, 23:41:45, and so on, as shown in FIG. 5.

Having received a normal write/read command, read controller 34 accesses the data just written to the first areas of memory $33_1$–$33_5$, as described above, to verify that the state of the stored data is such that the A-time immediately prior to the A-time data stored at the top address in the first area of memory $33_5$ is in the first area of memory $33_4$, the A-time immediately prior to A-time data stored at the top address in the first area of memory $33_4$ is in the first area of memory $33_3$, the A-time immediately prior to the A-time data stored at the top address in the first area of memory $33_3$ is in the first area of memory $33_2$, and the A-time immediately prior to the A-time data stored at the top address in the first area of memory $33_2$ is in the first area of memory $33_1$, thus verifying that there are no gaps in the data read from the five valid channels.

When reading performed by optical pickup 2 for approximately I=1 revolution (actually slightly more than one revolution) advances to position IV in FIG. 4, the contents of memories $33_1$–$33_5$ will be as shown in FIG. 5. Since it finds no gaps in the data read from the valid channels, the read controller 34 sends a halt command to the write controllers $31_1$–$31_5$ to halt the write operation, and a track jump command to the system controller 50. The read controller 34 then accesses the A-time data and the start and end addresses stored in the first areas of memories $33_1$–$33_5$, and starts reading the corresponding $DATA_1$–$DATA_5$ data from the first areas of memories $32_1$–$32_5$ (to which it was written this time). The read controller 34 outputs this data to the second signal processing circuit 40 in A-time sequence, starting with the data corresponding to the most recent A-time. In this case, it outputs the data corresponding to A-times 23:40:60 through 23:41:59. The A-time of the start read point originally specified by the host computer was 23:41:00. Therefore this data is output from the frame just prior to the start read point.

The second signal processing circuit 40 inputs the serial data output by parallel-to-serial converter 30. After descrambling this data block by block it performs error detection/ correction based on the CIRC code (P parity error detection/correction, de-interleaving, and Q parity error detection/correction). It then demodulates L and R channel data in accordance with the CD-DA standard; and from the resulting L and R channel data, performs additional sync detection, descrambling, header detection, and EDC and ECC code error correction based on the CD-ROM standard, in order to demodulate the CD-ROM data and output it to the external host computer.

When the write controllers $31_1$–$31_5$ receive the halt command they stop writing to memories $32_1$–$32_5$ and $33_1$–$33_5$. When the system controller 50 receives the track jump command, it sends commands to the servo circuit 23 to execute a track jump of J=3 tracks in the forward direction, causing the optical pickup 2 to jump from position IV of FIG. 4 to position V, and positioning the beams $3_1$–$3_5$ on-track to start reading data at tracks (x+3)–(x+7). Then, when the frame sync signals $FS_1$–$FS_5$ outputs of all of the first signal processing circuits $26_1$–$26_5$ go HIGH, the system controller 50 sends a "track jump completed" notification to the read controller 34.

Upon receiving the "track jump completed" notification, the read controller 34 sends a "resume" command to write controllers $31_1$–$31_5$, causing them to start writing to memory, the data output by the first signal processing circuits $26_1$–$26_5$ after the track jump. This time (after the track jump) the write controllers write the $DATA_1$–$DATA_5$ outputs to the second areas of the memories $32_1$–$32_5$, and write the corresponding A-time data ($AT_1$–$AT_5$) along with the memory $32_1$–$32_5$ start addresses ($a_{1s}$–$a_{5s}$) and end addresses ($a_{1e}$–$a_{5e}$) of the $DATA_1$–$DATA_5$ data currently being stored, to the second areas of memories $33_1$–$33_5$.(See FIG. 3.) For the case illustrated in FIG. 4, the data written as A-time data in the second areas of the memories $33_1$–$33_5$ would be 23:41:48, 23:41:63, 23:42:03, 23:42:18, 23:42:33, and so on, as shown in FIG. 5.

After issuing the "resume" command, the read controller 34 accesses the second areas of memories $33_1$–$33_5$ (the areas just written to) to verify that there are no gaps in the data read by the valid (h=5) beam $3_1$–$3_5$ channels as described above. It does this by verifying that the state of the stored data is such that the A-time immediately prior to the A-time data stored at the top address in the second area of memory $33_5$ is in the second area of memory $33_4$, the A-time immediately prior to the A-time data stored at the top address in the second area of memory $33_4$ is in the second area of memory $33_3$, the A-time immediately prior to the A-time data stored at the top address in the second area of memory $33_3$ is in the second area of memory $33_2$, and the A-time immediately prior to the A-time data stored at the top address in the second area of memory $33_2$ is in the second area of memory $33_1$.

When the reading performed by optical pickup 2 for approximately I=1 revolution (actually slightly more than one revolution) advances to position VI in FIG. 4, the contents of the second areas of memories $33_1$–$33_5$ will be as shown in FIG. 5. Since it finds no gaps in the data read from the valid channels, the read controller 34 sends a halt command to the write controllers $31_1$–$31_5$ to halt the write operation, and a track jump command to the system controller 50. The read controller 34 then accesses the A-time data and the start and end addresses stored in the second areas of memories $33_1$–$33_5$ (the areas to which it was written this time) and starts reading the corresponding $DATA_1$–$DATA_5$ data from the second areas of memories $32_1$–$32_5$ (to which it was written this time). The read controller 34 outputs this data to the second signal processing circuit 40 in A-time sequence, starting with the data corresponding to the A-time immediately following the last A-time of the block of data last output to the second signal processing circuit 40 the previous time (before the last track jump). In this case, it outputs the data corresponding to A-times 23:41:60 through 23:42:47.

When the write controllers $31_1$–$31_5$ receive the halt command they stop writing to memories $32_1$–$32_5$ and $33_1$–$33_5$. When the system controller 50 receives the track jump command, it jumps the optical pickup 2 from position VI of FIG. 4 to position VII, positioning the beams $3_1$–$3_5$ on-track to start reading data at tracks (x+7)–(x+11). Then, when the frame sync signal $FS_1$–$FS_5$ outputs of all of the first signal processing circuits $26_1$–$26_5$ go HIGH, the system controller 50 sends a "track jump completed" notification to the read controller 34.

Upon receiving the "track jump completed" notification through the read controller 34, write controllers $31_1$–$31_5$, start writing to memory, the data output by the first signal processing circuits $26_1$–$26_5$ after last the track jump. This time the write controllers write the $DATA_1$–$DATA_5$ outputs to the first areas of the memories $32_1$–$32_5$, and write the corresponding A-time data ($AT_1$–$AT_5$) along with the memory $32_1$–$32_5$ start addresses ($A_1$–$A_{5s}$) and end addresses ($A_{1e}$–$A_{5e}$) of the $DATA_1$–$DATA_5$ data currently being stored, to the first areas of memories $33_1$–$33_5$. If the A-times stored in the first areas of memories $33_1$–$33_5$ are all consecutive times, with no gaps, the read controller 34 reads out the contents of the first areas of memories $32_1$–$32_5$ for output in A-time sequence, starting with the data corresponding to the A-time immediately following the last A-time of the block of data last output to the second signal processing circuit 40 the previous time. From this point on, the above operations are repeated as required to read the desired data from CD-ROM 1 in the sequence in which it was recorded, at high speed, without duplications or gaps.

Figure 6:
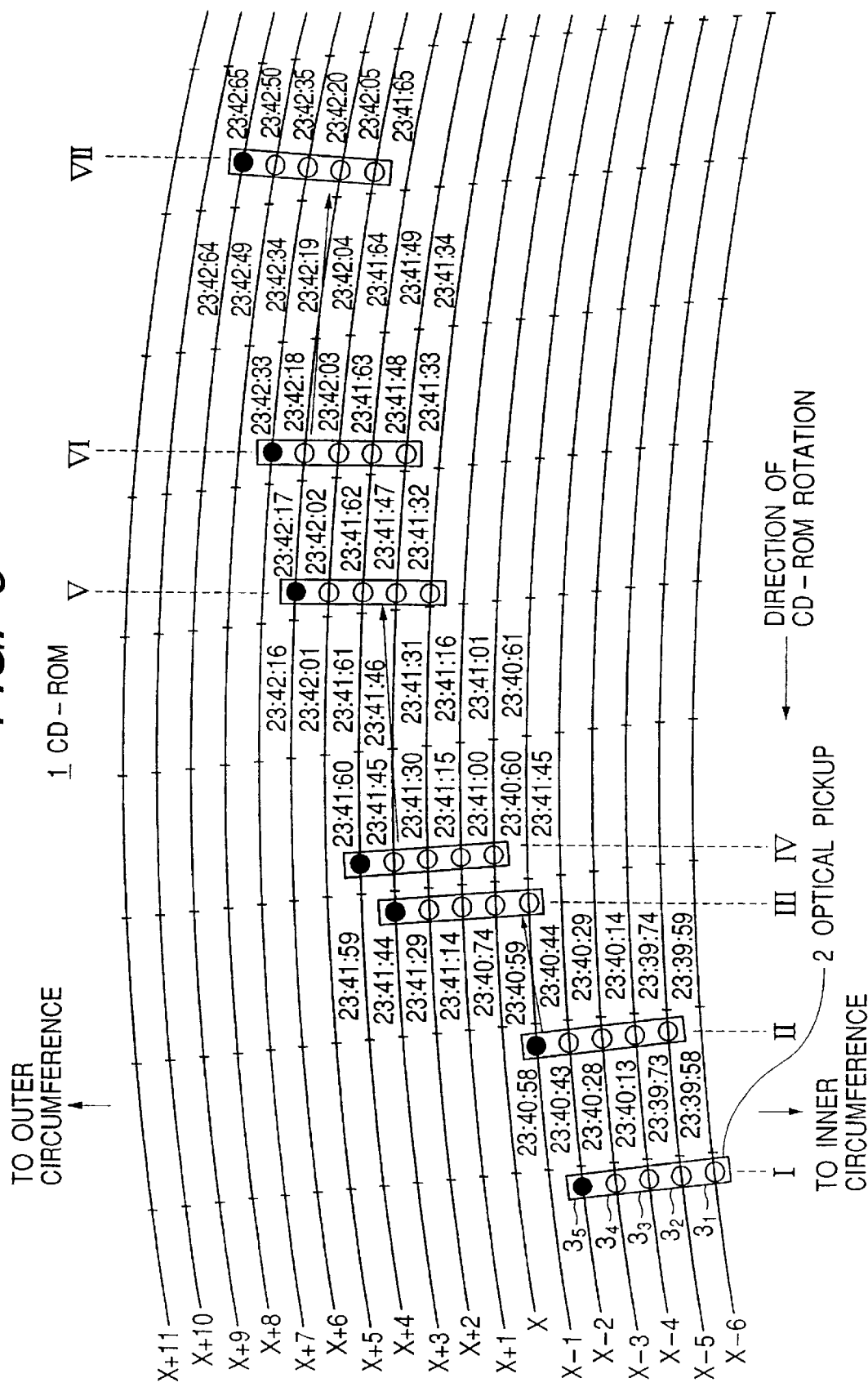
FIG. 6 shows an example of a data read operation in the CD-ROM readout system of FIG. 1.

(3) Special Write/Read Operation, Part 1 (Beam $3_5$ Channel Unreadable) (FIGS. 6 and 7)

If the system controller 50 determines, during one revolution of relative motion between the optical pickup 2 and CD-ROM 1, starting from position I of FIG. 6, that recorded data cannot be read from the outermost beam ($3_5$) channel, then the largest contiguous group of beam channels from which data can be read would be made up of the four beams $3_1$–$3_4$. Thus M≧3, where M is the number of beams in the largest contiguous group of beam channels from which data can be read. Accordingly, the channels of the M beams $3_1$–$3_4$ are designated as the h valid beam channels. Also, values I and J are set to I=1, and J=(M−2)=2, where I is the number of disk revolutions in a continuous data read (without track-jumping), and J is the number of tracks jumped in a track jump.

Also, from the newest A-time in the A-time data $AT_3$ input from the first signal processing circuit $26_3$, and the "read start point" A-time specified by the host computer, the system controller 50 determines the jump direction and number of tracks for a track jump that will put beam $3_1$ the innermost of the h=4 valid beams (the beam nearest the center of the disk), on-track, one track inside of track "x," the track that includes the A-time of the read start point (i.e., the jump that will put $3_1$ at track (x−1)), and executes that track jump.

When the h valid light beam channels are designated, and the values of I (the number of disk revolutions in a continuous data read) and J (the number of tracks jumped in a track jump) set, if the optical pickup 2 is located at position II of FIG. 6, it will be jumped forward from position II by four tracks, to put beams $3_1$–$3_4$ on-track at tracks (x−1)–(x+2) (position III in FIG. 6). Simultaneous reading of the recorded data in tracks (x−1) through (x+2) will then begin at that point through the four channels (circuits) made up of photodetector $PD_1$ through first signal processing circuit $26_1$, photodetector $PD_2$ through first signal processing circuit $26_2$, photodetector $PD_3$ through first signal processing circuit $26_3$, and photodetector $PD_4$ through first signal processing circuit $26_4$. Also, when HIGH level frame sync detect signals $FS_1$–$FS_4$ are received from all four of the first signal processing circuits $26_1$–$26_4$, a special write/read command including valid channel information "1, 2, 3, 4" is sent to parallel-to-serial converter 30.

The special write/read command is fed through read controller 34 to the write controllers. After that, only the write controllers $31_1$–$31_4$, identified in the valid channel information "1, 2, 3, 4" write the data $DATA_1$–$DATA_4$, received from first signal processor circuits $32_1$–$32_4$, respectively, a block at a time, to the first areas of the memories $26_1$–$26_4$, in sequence (the sequence in which it was recorded). The write controllers also write the A-time data corresponding to the above data to memory, along with the memory addresses at which that data is located, as follows: $AT_1$–$AT_4$ (the A-time data for $DATA_1$–$DATA_4$) is written to the first areas of memories $33_1$–$33_4$, along with start addresses $A_{1s}$–$A_{4s}$ and end addresses $A_{1e}$–$A_{4e}$ (as start/end address pairs) in memories $32_1$–$33_4$ at which the corresponding data is stored. For the case illustrated in FIG. 6, the data written as A-time data in the first areas of each of the memories $33_1$–$33_4$, would be 23:40:60, 23:41:00, 23:41:15, 23:41:30, and so on, as shown in FIG. 7.

Having received a special write/read command, read controller 34 checks only the data written to the memories in the indicated valid channel information "1, 2, 3, 4". Thus it accesses the data just written to the first areas of memories $33_1$–$33_4$, to verify that the state of the stored data is such that
  the A-time immediately prior to the A-time data stored at the top address in the first area of memory $33_4$ is included in the first area of memory $33_3$,
  the A-time immediately prior to the A-time data stored at the top address in the first area of memory $33_3$ is included in the first area of memory $33_2$, and
  the A-time immediately prior to the A-time data stored at the top address in the first area of memory $33_2$ is included in the first area of memory $33_1$,
thus verifying that there are no gaps in the data read from the valid channels.

When reading performed by optical pickup 2 for approximately I=1 revolutions (actually slightly more than one revolution) advances to position IV in FIG. 6, the contents of memories $33_1$–$33_4$ will be as shown in FIG. 7. Because it finds no gaps in the data read from the valid channels, the read controller 34 sends a halt command to the write controllers $31_1$–$31_4$ to halt the write operation, and a track jump command to the system controller 50. The read controller 34 then accesses the A-time data and the start and end addresses stored in the first areas of memories $33_1$–$33_4$, and starts reading the corresponding $DATA_1$–$DATA_4$ data from the first areas of memories $32_1$–$32_4$ (to which it was written this time). The read controller 34 outputs this data to the signal processing circuit 40 in A-time sequence, starting with the data corresponding to the newest A-time. In this case, it outputs the data corresponding to A-times 23:40:60 through 23:41:44.

When the write controllers $31_1$–$31_4$ receive the halt command they stop writing to memories $32_1$–$32_4$ and $33_1$–$33_4$. When the system controller 50 receives the track jump command, it sends commands to the servo circuit 23 to execute a track jump of J=2 tracks in the forward direction, causing the optical pickup 2 to jump from position IV of FIG. 6 to position V, and positioning the beams $3_1$–$3_4$ on-track to start reading recorded data at tracks (x+2)–(x+5). Then, when the frame sync detect signal outputs ($FS_1$–$FS_4$) of all of the first signal processing circuits $26_1$–$26_4$ go HIGH, the system controller 50 sends a "track jump completed" notification to the read controller 34.

Upon receiving the "track jump completed" notification, the read controller 34 sends a "resume" command to write controllers $31_1$–$31_4$, causing them to start writing to memory, the data output by the first signal processing circuits $26_1$–$26_4$ after the track jump. This time, the write controllers write the $DATA_1$–$DATA_4$ outputs to the second areas of the memories $32_1$–$32_4$, and write the corresponding A-time data ($AT_1$–$AT_4$) along with the memory $32_1$–$32_4$ start addresses ($a_1$–$a_{4s}$) and end addresses ($a_{1e}$–$a_{4e}$) of the $DATA_1$–$DATA_4$ data currently being stored, to the second areas of memories $33_1$–$33_4$. For the case illustrated in FIG. 6, the data written as A-time data in the second areas of the memories $33_1$–$33_4$, would be 23:41:33, 23:41:48, 23:41:63, 23:42:03, and so on, as shown in FIG. 7.

After issuing the "resume" command, the read controller 34 accesses the second areas of memories $33_1$–$33_4$ (the areas just written to) to verify that there are no gaps in the data read by the valid channels. It does this by verifying that the state of the stored data is such that
  the A-time immediately prior to the A-time data stored at the top address in the second area of memory $33_4$ is included in the second area of memory $33_3$,
  the A-time immediately prior to the A-time data stored at the top address in the second area of memory $33_3$ is included in the second area of memory $33_2$, and
  the A-time immediately prior to the A-time data stored at the top address in the second area of memory $33_2$ is in the second area of memory $33_1$.

When the reading performed by optical pickup 2 for approximately I=1 revolution (actually slightly more than one revolution) advances to position VI in FIG. 6, the contents of the second areas of memories $33_1$–$33_4$ will be as shown in FIG. 7. Because it finds no gaps in the data read from the valid channels (1, 2, 3, and 4), the read controller 34 sends a halt command to the write controllers $31_1$–$31_4$ to halt the write operation, and a track jump command to the system controller 50. The read controller 34 then accesses the A-time data and the start and end addresses stored in the second areas of memories $33_1$–$33_4$, and starts reading the corresponding $DATA_1$–$DATA_4$ data from the second areas of memories $32_1$–$32_4$ (the areas to which it was written this time). The read controller 34 outputs this data to the second signal processing circuit 40 in A-time sequence, starting with the data corresponding to the A-time immediately following the last A-time of the block of data last output to the second signal processing circuit 40 the previous time (before the last track jump). In this case, it outputs the data corresponding to A-times 23:41:45 through 23:42:17.

When the write controllers $31_1$–$31_4$ receive the halt command they stop writing. When the system controller 50 receives the track Jump command, it jumps the optical pickup 2 from position VI of FIG. 6 to position VII, positioning the beams $3_1$–$3_4$ on-track to start reading data at tracks (x+5)–(x+8). Then, when the frame sync detect signal $FS_1$–$FS_4$ outputs of all of the first signal processing circuits $26_1$–$26_4$ go HIGH, the system controller 50 sends a "track jump completed" notification to the read controller 34.

From this point on, the above operations repeat until the desired recorded data has been read from the CD-ROM 1 in the sequence in which it was recorded, using the four valid beams $3_1$–$3_4$, operating at high speed, and with no duplications or gaps in the data.

Figure 8:
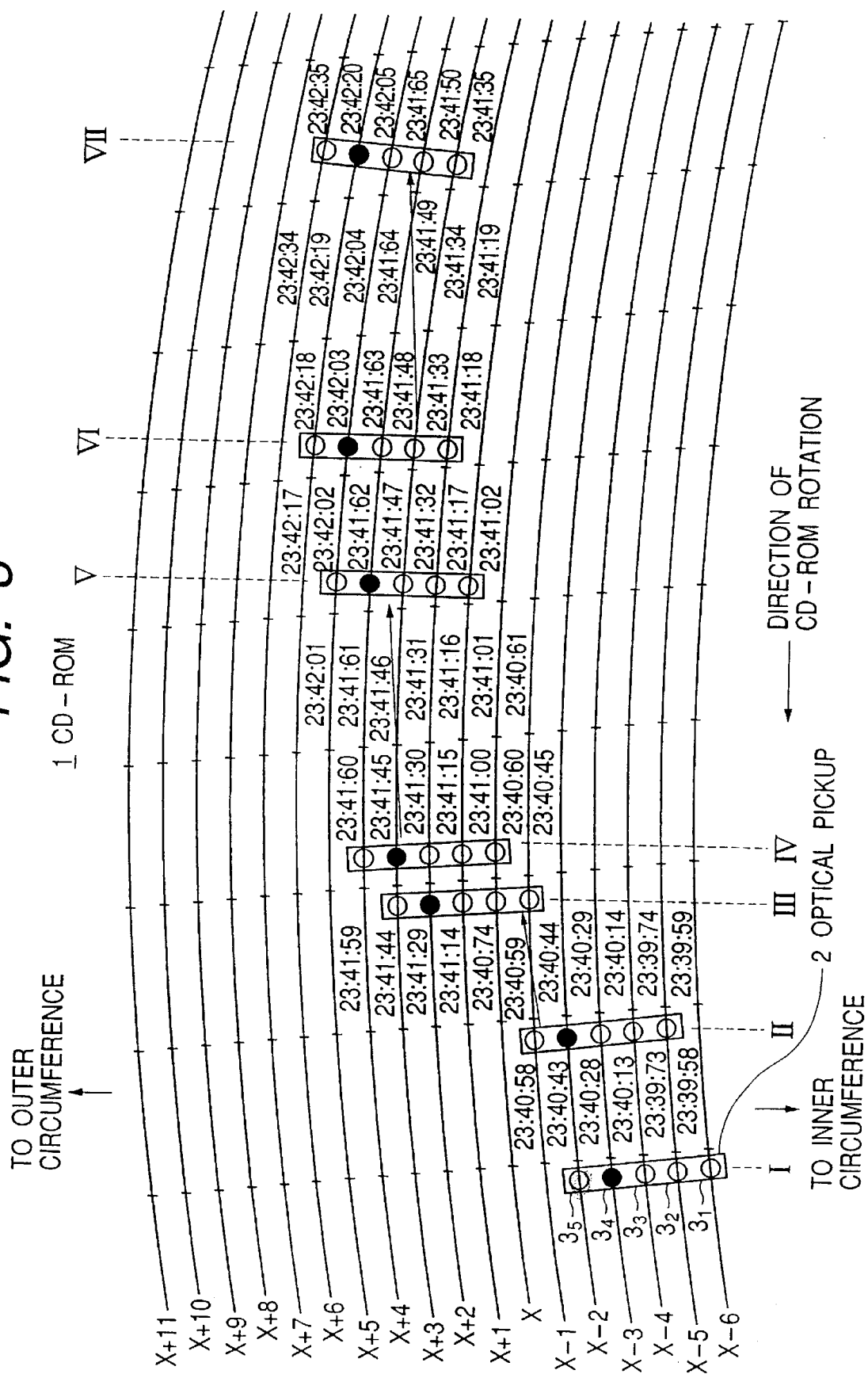
FIG. 8 shows an example of a data read operation in the CD-ROM readout system of FIG. 1.
Figure 9:
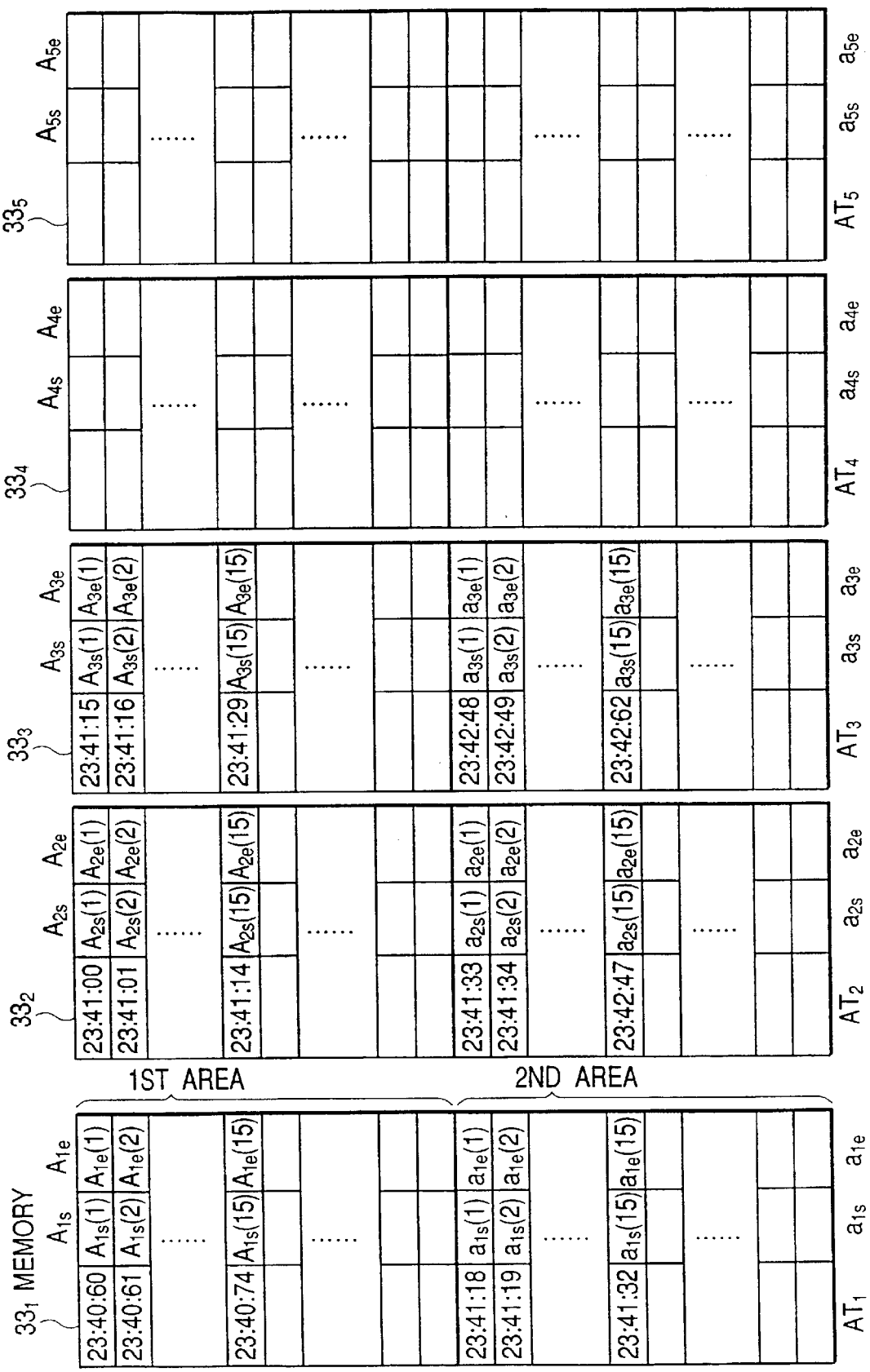
FIG. 9 shows an example of the contents of the memories of FIG. 2.

(4) Special Write/Read Operation, Part 2 (Beam $3_4$ Channel Unreadable) (FIGS. 8 and 9)

If the system controller 50 determines, during one revolution of relative motion between the optical pickup 2 and CD-ROM 1, starting from position I of FIG. 8, that recorded data cannot be read from the beam ($3_4$) channel, then the largest contiguous group of remaining beam channels from which data can be read would be made up of the three beams $3_1$–$3_3$. Thus $\geq 3$, where M is the number of beams in the largest contiguous group of beam channels from which data can be read. Accordingly, the channels of the M beams $3_1$–$3_3$ are designated as the h valid beam channels. Also, values I and J are set to I=1, and J=(M−2)=1, where I is the number of disk revolutions in a continuous data read (without track-jumping), and J is the number of tracks jumped in a track jump. Also, from the newest [(latest)] A-time in the A-time data $AT_3$ input from the first signal processing circuit $26_3$, and the "read start point" A-time specified by the host computer, [the system controller 50] determines the jump direction and number of tracks for a track jump that will put beam $3_1$, the innermost of the h=3 valid beams (the beam nearest the center of the disk), on-track, one track inside of track "x," the track that includes the A-time of the read start point (i.e., the jump that will put $3_1$ at track (x−1)), and executes that track jump.

When the h valid light beam channels are designated, and the values of I (the number of disk revolutions in a continuous data read) and J (the number of tacks jumped in a track jump) set, if the optical pickup 2 is located at position II of FIG. 8, it will be jumped forward from position II by four tracks, to put beams $3_1$–$3_3$ on-track at tracks (x−1)–(x+1) (position III in FIG. 8). Simultaneous reading of the recorded data in tracks (x−1) through (x+1) will then begin at that point, through the three channels (circuits) made up of photodetector $PD_1$ through first signal processing circuit $26_1$, photodetector $PD_2$ through first signal processing circuit $26_2$, and photodetector $PD_3$ through first signal processing circuit $26_3$. Also, when HIGH level frame sync detect signals $FS_1$–$FS_3$ are received from all three of the first signal processing circuits $26_1$–$26_3$, a special write/read command including valid channel information "1, 2, 3" is sent to parallel-to-serial converter 30.

The special write/read command is fed through read controller 34 to the write controllers. After that, only the write controllers $31_1$–$31_3$, identified in the valid channel information "1, 2, 3" write the data $DATA_1$–$DATA_3$, received from first signal processor circuits $26_1$–$26_3$, respectively, a block at a time, to the first areas of the memories $26_1$–$26_3$, in sequence [(the sequence in which it was recorded)]. The write controllers also write the A-time data corresponding to the above data to memory, along with the memory addresses at which that data is located, as follows: $AT_1$–$AT_3$ (the A-time data for $DATA_1$–$DATA_3$) is written to the first areas of memories $33_1$–$33_3$, along with the start/end address pairs made up of start addresses $A_{1s}$–$A_{3s}$ and end addresses $A_{1e}$–$A_{3e}$ in memories $32_1$–$33_3$ at which the corresponding data is stored. For the case illustrated in FIG. 8, the data written as A-time data in the first areas of each of the memories $33_1$–$33_3$, would be 23:40:60, 23:41:00, 23:41:15, and so on, as shown in FIG. 9.

Having received a special write/read command, read controller 34 checks only the data written to the memories in the indicated valid channels "1, 2, 3". Thus it accesses the data just written to the first areas of memories $33_1$–$33_3$, to verify that the state of the stored data is such that the A-time immediately prior to the A-time data stored at the top address in the first area of memory $33_3$ is included in the first area of memory $33_2$, and the A-time immediately prior to the A-time data stored at the top address in the first area of memory $33_2$ is included in the first area of memory $33_1$, thus verifying that there are no gaps in the data read from the valid channels.

When reading performed by optical pickup 2 at approximately I=1 revolution (actually slightly more than one revolution) advances to position IV in FIG. 8, the contents of the first areas of memories $33_1$–$33_3$ will be as shown in FIG. 9. Because it finds no gaps in the data read from the valid channels, the read controller 34 sends a halt command to the write controllers $31_1$–$31_3$ to halt the write operation, and a track jump command to the system controller 50. The read controller 34 then accesses the A-time data and the start and end addresses stored in the first areas of memories $33_1$–$33_3$, and starts reading the corresponding $DATA_1$–$DATA_3$ data from the first areas of memories $32_1$–$32_3$ (to which it was written this time). The read controller 34 outputs this data to the signal processing circuit 40 in A-time sequence, starting with the data corresponding to the newest A-time. In this case, it outputs the data corresponding to A-times 23:40:60 through 23:41:29.

When the write controllers $31_1$–$31_3$ receive the halt command, they stop writing. When the system controller 50 receives the track jump command, it sends commands to the servo circuit 23 to execute a track jump of J=1 tracks in the forward direction, causing the optical pickup 2 to jump from position IV of FIG. 8 to position V, and positioning the beams $3_1$–$3_3$ on-track to start reading recorded data at tracks (x+1)–(x+3). Then, when the frame sync detect signal $FS_1$–$FS_3$ outputs of all of the first signal processing circuits $26_1$–$26_3$ go HIGH, the system controller 50 sends a "track jump completed" notification to the read controller 34.

Upon receiving the "track jump completed" notification, the read controller 34 sends a "resume" command to write controllers $31_1$–$31_3$, causing them to start writing to memory, the data output by the first signal processing circuits $26_1$–$26_3$ after the track jump. This time, the write controllers write the $DATA_1$–$DATA_3$ outputs to the second areas of the memories $32_1$–$32_3$, and write the corresponding A-time data ($AT_1$–$AT_3$) along with the memory $32_1$–$32_3$ start addresses ($a_{1s}$–$a_{3s}$) and end addresses ($a_{1e}$–$a_{3e}$) of the $DATA_1$–$DATA_3$ data currently being stored, to the second areas of memories $33_1$–$33_3$. For the case illustrated in FIG. 8, the data written as A-time data in the second areas of the memories $33_1$–$33_3$, would be 23:41:18, 23:41:33, 23:41:48, and so on, as shown in FIG. 9.

After issuing the "resume" command, the read controller 34 accesses the second areas of memories $33_1$–$33_3$ (the areas just written to) to verify that there are no gaps in the data read by the valid channels. It does this by verifying that the state of the stored data is such that the A-time immediately prior to the A-time data stored at the top address in the second area of memory $33_3$ is included in the second area of memory $33_2$, and the A-time immediately prior to the A-time data stored at the top address in the second area of memory $33_2$ is included in the second area of memory $33_1$.

When the reading performed by optical pickup 2 at approximately I=1 revolution (actually slightly greater than one revolution) advances to position VI in FIG. 8, the contents of the second areas of memories $33_1$–$33_3$ will be as shown in FIG. 9. Because it finds no gaps in the data read from the valid channels (1, 2 and 3), the read controller 34 sends a halt command to the write controllers $31_1$–$31_3$ to halt the write operation, and a track jump command to the system controller 50. The read controller 34 then accesses the A-time data and the start and end addresses stored in the second areas of memories $33_1$–$33_3$, and starts reading the corresponding $DATA_1$–$DATA_3$ data from the second areas of memories $32_1$–$32_3$ (the areas to which it was written this time). The read controller 34 outputs this data to the second signal processing circuit 40 in A-time sequence, starting with the data corresponding to the A-time immediately following the A-time of the block of data last output to the second signal processing circuit 40 the previous time (before the last track jump). In this case, it outputs the data corresponding to A-times 23:41:30 through 23:41:62.

When the write controllers $31_1$–$31_3$ receive the halt command, they stop writing. When the system controller 50 receives the track jump command, it jumps the optical pickup 2 by one track from position VI of FIG. 8 to position VII, positioning the beams $3_1$–$3_3$ on-track to start reading data at tracks (x+3)–(x+5).

From this point on, the above operations repeat until the desired recorded data has been read from the CD-ROM 1 in the sequence in which it was recorded, using the three valid beams $3_1$–$3_3$, operating at high speed, and with no duplications or gaps in the data.

Figure 10:
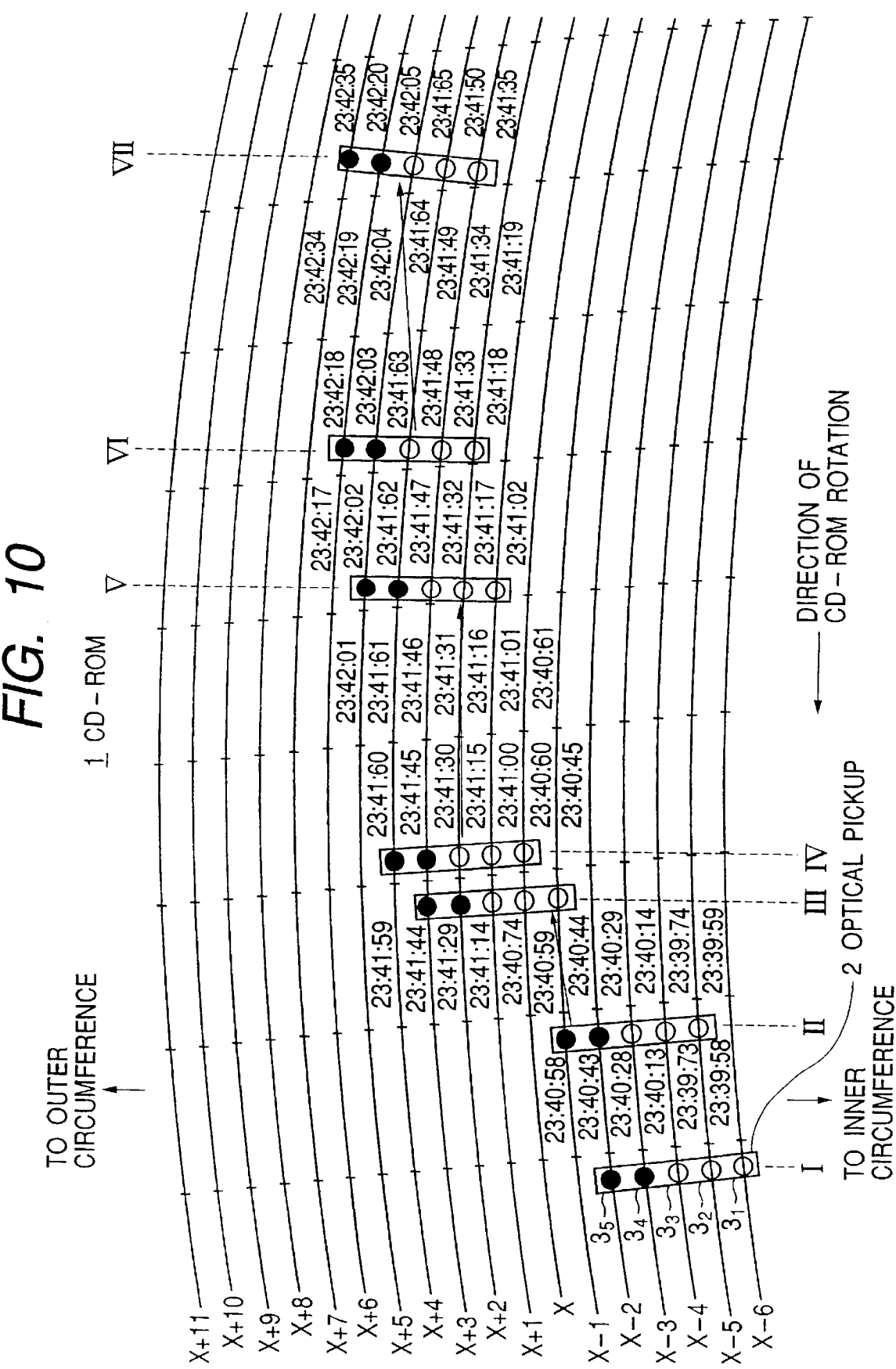
FIG. 10 shows an example of a data read operation in the CD-ROM readout system of FIG. 1.

(5) Special Write/Read Operation, Part 3 (Beam Channel $3_4$ and $3_5$ Unreadable) (FIGS. 9 and 10)

If [the system controller 50] determines, during one revolution, with the optical pickup 2 starting from position I of FIG. 10, that recorded data cannot be read from the beam $3_4$ and $3_5$ channels, then the largest contiguous group of remaining beam channels from which data can be read would be made up of the three beams $3_1$–$3_3$. Thus M≧3, where M is the number of beams in the largest contiguous group of beam channels from which data can be read. Accordingly, the channels of the M beams $3_1$–$3_3$ are designated as the h valid beam channels. Also, values I and J are set to I=1, and J=(M−2)=1, where I is the number of disk revolutions in a continuous data read (without track-jumping), and J is the number of tracks jumped in a track jump. Also, from the newest A-time in the A-time data $AT_3$ input from the first signal processing circuit $26_3$, and the "read start point" A-time specified by the host computer, the system controller 50 determines the jump direction and number of tracks for a track jump that will put beam 31, the innermost of the h=3 valid beams (the beam nearest the center of the disk), on-track, one track inside of track "x," the track that includes the A-time of the read start point (i.e., the jump that will put beam $3_1$ at track (x−1)), and executes that track jump.

When the h valid light beam channels are designated, and the values of I (the number of disk revolutions in a continuous data read) and J (the number of tracks jumped in a track jump) set, if the optical pickup 2 is located at position II of FIG. 10 [sic], it will be jumped forward from position II by four tracks, to put beams $3_1$–$3_3$ on-track at tracks (x−1)–(x+1). Simultaneous reading of the recorded data in tracks (x−1) through (x+1) will then begin at that point, through the three channels (circuits) made up of photodetector $PD_1$ through first signal processing circuit $26_1$, photodetector $PD_2$ through first signal processing circuit $26_2$, and photodetector $PD_3$ through first signal processing circuit $26_3$. Also, when HIGH level frame sync detect signals $FS_1$–$FS_3$ are received from all three of the first signal processing circuits $26_1$–$26_3$, a special write/read command including valid channel information "1, 2, 3" is sent to parallel-to-serial converter 30.

From this point on, the operation is exactly the same as the case shown in FIG. 8: At the spot where the data has been read for approximately one revolution of CD-ROM 1, a forward jump of J=1 is executed, and at the spot where approximately another revolution of recorded data has been read, another forward jump of J=1 is executed, and so on. This is repeated (positions III–VII in FIG. 10) to continue to read out the recorded data, in the sequence in which it was recorded, at high speed, with no duplications or gaps in the data.

Figure 11:
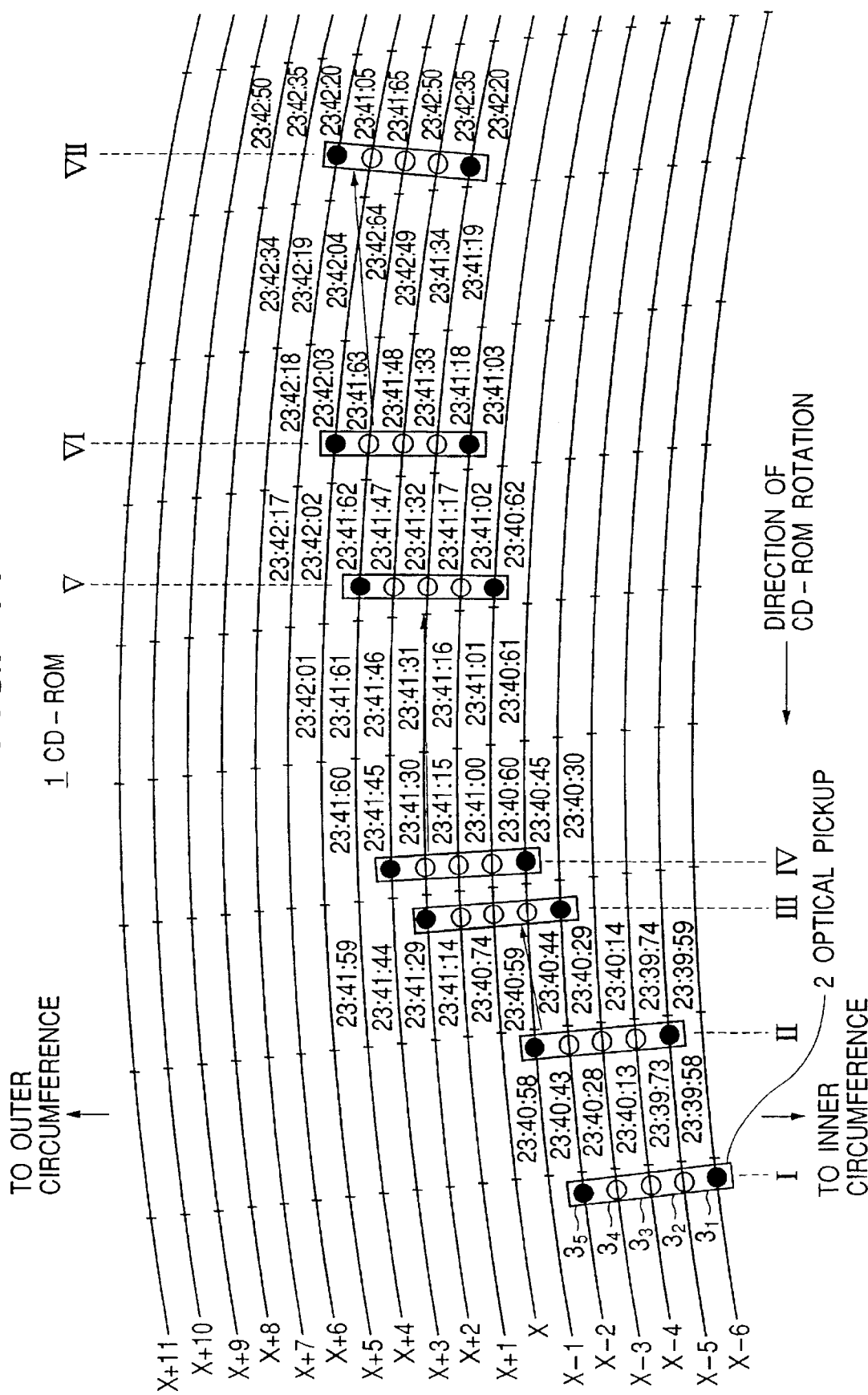
FIG. 11 shows an example of a data read operation in the CD-ROM readout system of FIG. 1.

(6) Special Write/Read Operation, Part 4 (Beam Channel $3_1$ and $3_5$ Unreadable) (FIG. 11)

If [the system controller 50] determines, during one revolution of relative motion between the optical pickup 2 and CD-ROM 1, starting from position I of FIG. 11, that recorded data cannot be read from the beam 31 and 35 channels, then the largest contiguous group of remaining beam channels from which data can be read would be made up of the three beams $3_2$–$3_4$. Thus M≧3, where M is the number of beams in the largest contiguous group of beam channels from which data can be read. Accordingly, the channels of the M beams $3_2$–$3_4$ are designated as the h valid beam channels. Also, values I and J are set to I=1, and J=(M−2)=1, where I is the number of disk revolutions in a continuous data read [(without track-jumping)], and J is the number of tracks jumped in a track jump. Also, from the newest A-time in the A-time data $AT_3$ input from the first signal processing circuit $26_3$, and the "read start point" A-time specified by the host computer, the system controller 50 determines the jump direction and number of tracks for a track jump that will put beam $3_2$, the innermost of the h=3 valid beams (the valid beam nearest the center of the disk), on-track, one track inside of track "x," the track that includes the A-time of the read start point (i.e., the jump that will put beam $3_2$ on-track at track (x−1)), and executes that track jump.

When the h=3 valid light beam channels are designated, and the values of I (the number of disk revolutions in a continuous data read) and J (the number of tracks jumped in a track jump) set, if the optical pickup 2 is located at position II of FIG. 11, it will be jumped forward from position II by three tracks, to put beams $3_3$–$3_4$ on-track at tracks (x−1)–(x+1) (position III in FIG. 8). Simultaneous reading of the recorded data in tracks (x−1) through (x+1) will then begin at that point, through the three channels (circuits) made up of photodetector $PD_2$ through first signal processing circuit $26_2$, photodetector $PD_3$ through first signal processing circuit $26_3$, and photodetector $PD_4$ through first signal processing circuit $26_4$. Also, when HIGH level frame sync detect signals $FS_2$–$FS_4$ are received from all three of the first signal processing circuits $26_2$–$26_4$, a special write/read command including valid channel information "2, 3, 4" is sent to parallel-to-serial converter 30.

From that point on, operation is almost the same as for the case illustrated in FIG. 8. (In the FIG. 11 case, the write controllers $31_2$–$31_4$ write the data $DATA_2$–$DATA_4$, from first signal processor circuits $26_2$–$26_4$, and the A-time data $AT_1$–$AT_3$ to memories $32_2$–$32_4$, and $33_1$–$33_3$. Also, the read controller 34 checks the A-time and start and end address data stored in memories $33_2$–$33_4$, and then reads out the data stored in memories $32_2$–$32_4$ [sic] so that it will be in A-time sequence, and will have no duplications or gaps in it.) At the location where recorded data has been read for approximately one revolution of the CD-ROM 1, a forward jump of J=1 track is executed, and after reading data for another turn, another jump is executed, and so on, continuing, in this manner, to read the recorded data at high speed, in the sequence in which it was recorded, with no duplications or gaps in the output data.

Figure 12:
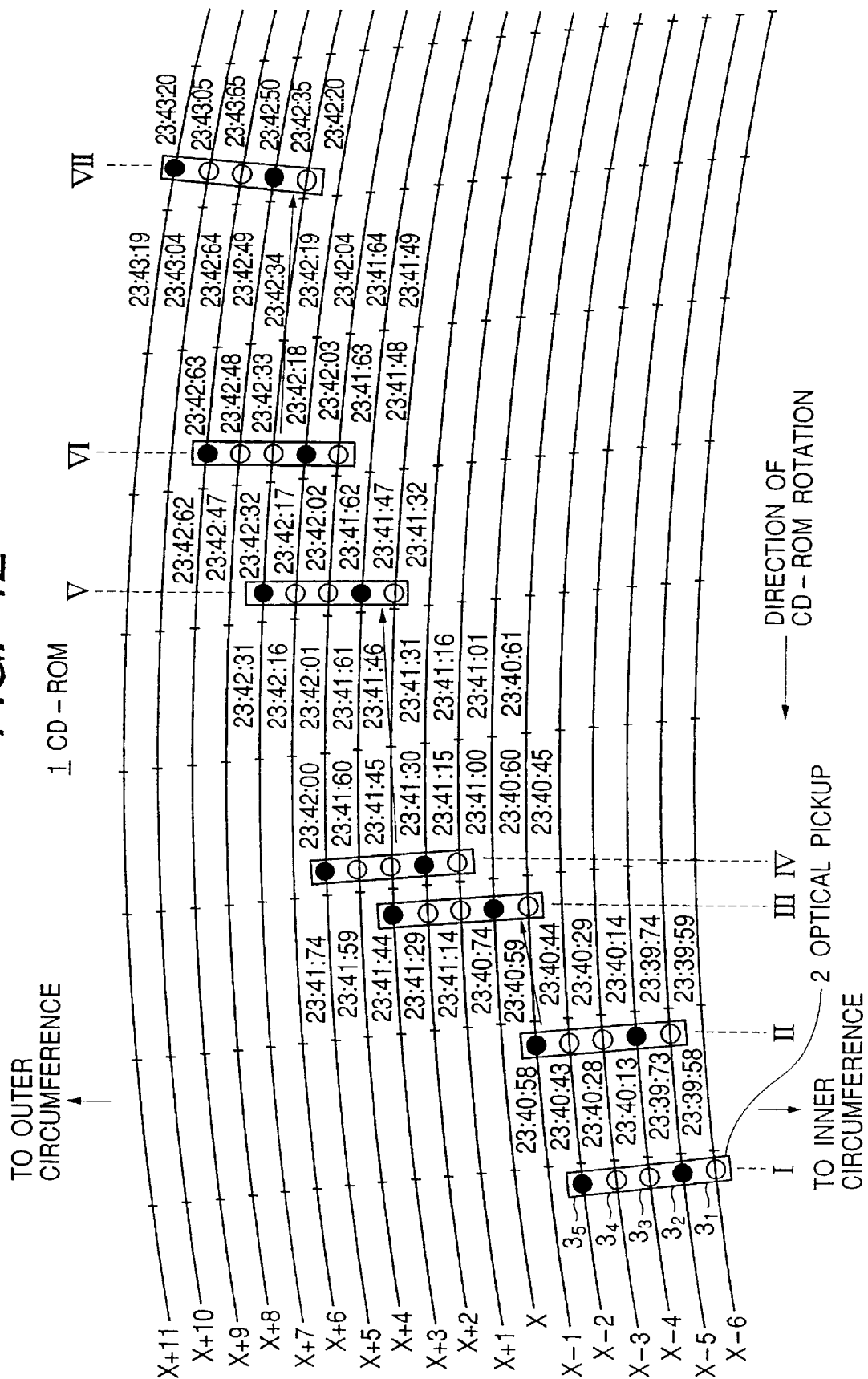
FIG. 12 shows an example of a data read operation in the CD-ROM readout system of FIG. 1.

(7) Special Write/Read Operation, Part 5 (Beam Channel $3_2$ and $3_5$ Unreadable) (FIGS. 12 and 13)

If the system controller 50 determines, during one revolution of relative motion between the optical pickup 2 and CD-ROM 1, starting from position I of FIG. 12, that recorded data cannot be read from the beam $3_2$ and $3_5$ channels, the largest contiguous group within the remaining three beam channels from which data can be read ($3_1$, $3_3$, and $3_4$) would then consist of only the two beams $3_3$ and $3_4$. If we try to read data at high speed [as described earlier], by repeatedly alternating between reading for approximately one turn of the CD-ROM 1, then performing track jumps, we will find that it cannot be done: To read data in this manner, there must be at least three readable light beam channels in a contiguous group. Even when this condition (M≧3) is not met, however, high speed reading of data can still be performed by combining readable channels and performing repeated operations wherein data is read by the combined channels over multiple revolutions of CD-ROM 1, followed by track jumps of a prescribed number of tracks.

Specifically, in repeated cycles of continuous reading and track jump operations, the number of disk revolutions of continuous reading, and the number of tracks to be jumped, may be determined as follows with Q as the distance, in number of tracks, between the innermost and outermost beams of light beam channels capable of reading recorded data, and R as the number of beams in the most populous contiguous group of light beam channels incapable of reading recorded data, whose beams lie between the above innermost and outermost light beams, then if Q is at least 2, and R is at least 1, (R+1) is the number of disk revolutions of continuous reading by the beams capable of reading recorded data (I), and (Q−1) is the number of tracks to be jumped forward (J).

In the present case, the innermost and outermost beams of light beam channels capable of reading recorded data, are beams $3_1$ and $3_4$. Therefore, the distance between them, in number of tracks would be Q=(4−1)=3. Also, the most populous contiguous group of light beam channels incapable of reading recorded data, whose beams lie between beams $3_1$ and $3_4$, consists of only one light beam: beam $3_2$. Therefore, R=1. All three beams that are capable of reading recorded data, $3_1$, $3_3$, and $3_4$, are designated as the h=3 light beam channels. The number of disk revolutions of continuous reading=I=(R+1)=2. The number of tracks to be jumped in track jumps performed during read=J=(Q−1)=2. Thus I and J are both set to 2.

When the h−3 valid light beam channels are designated, and the values of I (the number of disk revolutions in a continuous data read) and J (the number of tracks jumped in a track jump) are set to I=2 and J=2, if the optical pickup 2 is located at position II of FIG. 12, it will be jumped forward from position II by four tracks, to put beams $3_1$, $3_3$, and $3_4$ on-track at tracks (x−1), (x+1), and (x+2) (position III in FIG. 12). Simultaneous reading of the recorded data in tracks (x−1), (x+1), and (x+2) will then begin at that point, through the three channels (circuits) made up of photodetector $PD_1$ through first signal processing circuit $26_1$, photodetector $PD_3$ through first signal processing circuit $26_3$, and photodetector $PD_4$ through first signal processing circuit $26_4$. Also, when HIGH level frame sync detect signals $FS_1$, $FS_3$, and $FS_4$ are received from all three of the first signal processing circuits $26_1$, $26_3$, and $26_4$, a special write/read command including valid channel information "1, 3, 4" is sent to parallel-to-serial converter 30.

The special write/read command is fed through read controller 34 to the write controllers. After that, only the write controllers $31_1$, $31_3$, and $31_4$ identified in the valid channel information "1, 3, 4" write the data $DATA_1$, $DATA_3$, and $DATA_4$, received from first signal processor circuits $26_1$, $26_3$, and $26_4$, respectively, a block at a time, to the first areas of the memories $32_1$, $32_3$, and $32_4$, in sequence (the sequence in which it was recorded). The write controllers also write the A-time data corresponding to the above data to memory, along with the memory addresses at which that data is located, as follows: $AT_1$, $AT_3$, and $AT_4$ (the A-time data for $DATA_1$, $DATA_3$, and $DATA_4$) is written to the first areas of memories $33_1$, $33_3$, and $33_4$ along with the start addresses $A_{1s}$, $A_{3s}$, and $A_{4s}$ and end addresses $A_{1e}$, $A_{3e}$, and $A_{4e}$ of memories $32_1$, $33_3$, and $33_4$, [at which the corresponding data is stored]. For the case illustrated in FIG. 12, the data written as A-time data in the first areas of each of the memories $33_1$, $33_3$, and $33_4$ would be 23:40:60, 23:41:15, 23:41:30, and so on, as shown in FIG. 13.

Having received a special write/read command, read controller 34 checks only the data written to the memories in the indicated valid channels "1, 3, 4". Thus it accesses the data just written to the first areas of memories $33_1$, $33_3$, and $33_4$ to verify that the state of the stored data is such that the A-time immediately prior to the A-time data stored at the top address in the first area of memory $33_4$ is included in the first area of memory $33_3$, and the A-time immediately prior to the A-time data stored at the top address in the first area of memory $33_3$ is included in the first area of memory $33_1$, thus verifying that there are no gaps in the data read from the valid channels.

When reading performed by optical pickup 2 at approximately I=2 (actually slightly greater than 2) advances to position IV in FIG. 12, the contents of memories $33_1$, $33_3$, and $33_4$ will be as shown in FIG. 13. Because it finds no gaps in the data read from the valid channels, the read controller 34 sends a halt command to the write controllers $31_1$, $31_3$, and $33_4$ to halt the write operation, and sends a track jump command to the system controller 50. The read controller 34 then accesses the A-time data and the start and end addresses stored in the first areas of memories $33_1$, $33_3$, and $33_4$, and starts reading the corresponding data from the first areas of memories $32_1$, $32_3$, and $32_4$ (to which it was written this time). The read controller 34 outputs this data to the signal processing circuit 40 in A-time sequence, starting with the data corresponding to the newest A-time. In this case, it outputs the data corresponding to A-times 23:40:60 through 23:41:59.

When the write controllers $31_1$, $31_3$, and $31_4$ receive the halt command, they stop writing. When the system controller 50 receives the track jump command, it sends commands to the servo circuit 23 to execute a track jump of J=2 tracks in the forward direction, causing the optical pickup 2 to jump from position IV of FIG. 12 to position V, and positioning the beams $3_1$, $3_3$, and $3_4$ on-track to start reading data at tracks (x+3), (x+5), and (x+6). Then, when the frame sync detect signal $FS_1$, $FS_3$, and $FS_4$ outputs of all of the first signal processing circuits $26_1$, $26_3$, and $26_4$ go HIGH, the system controller sends a "track jump completed" notification to the read controller 34.

Upon receiving the "track jump completed" notification, the read controller 34 sends a "resume" command to write controllers $31_1$, $31_3$, and $31_4$, causing them to start writing to memory, the data output by the first signal processing circuits $26_1$, $26_3$, and $26_4$ after the track jump. This time, the write controllers write these $DATA_1$, $DATA_3$, and $DATA_4$ outputs to the second areas of the memories $32_1$, $32_3$, and $32_4$, and write the corresponding A-time data ($AT_1$, $AT_3$, and $AT_4$) along with the memory $32_1$, $32_3$, and $32_4$ start addresses ($a_{1s}$, $a_{3s}$, and $a_{4s}$) and end addresses ($a_{1e}$, $a_{3s}$, and $a_{4s}$) of the $DATA_1$, $DATA_3$, and $DATA_4$ data currently being stored, to the second areas of memories $33_1$, $33_3$, and $33_4$. For the case illustrated in FIG. 12, the data written as A-time data in the second areas of the memories $33_1$, $33_3$, and $33_4$ would be 23:41:48, 23:42:03, 23:42:18, and so on, as shown in FIG. 13.

After issuing the "resume" command, the read controller 34 accesses the second areas of memories $33_1$, $33_3$, and $33_4$ (the areas just written to) to verify that there are no gaps in the data read by the valid channels. It does this by verifying that the state of the stored data is such that the A-time immediately prior to the A-time data stored at the top address in the second area of memory $33_4$ is included in the second area of memory $33_3$, and the A-time immediately prior to the A-time data stored at the top address in the second area of memory $33_3$ is included in the second area of memory $33_1$.

When the reading performed by optical pickup 2 at approximately I=2 revolutions (actually slightly greater more than two revolutions) advances to position VI in FIG. 12, the contents of the second creases of memories $33_1$, $33_3$, and $33_4$ will be as shown in FIG. 13. Because it finds no gaps in the data read from the valid channels (1, 3, and 4), the read controller 34 sends a halt command to the write controllers $31_1$, $31_3$, and $31_4$ to halt the write operation, and a track jump command to the system controller 50. The read controller 34 then accesses the A-time data and the start and end addresses stored in the second areas of memories $33_1$, $33_3$, and $33_4$, and starts reading the corresponding data from the second areas of memories $32_1$, $32_3$, and $32_4$ (the areas to which it was written this time). The read controller 34 outputs this data to the second signal processing circuit 40 in A-time sequence, starting with the data corresponding to the A-time immediately following the A-time of the block of data last output to the second signal processing circuit 40 the previous time (before the last track jump). In this case, it outputs the data corresponding to A-times 23:41:60 through 23:42:47.

When the write controllers $31_1$, $31_3$, and $31_4$ receive the halt command, they stop writing. When the system controller 50 receives the track jump command, it jumps the optical pickup 2 by J=2 tracks, from position VI of FIG. 12 to position VII, positioning the beams $3_1$, $3_3$, and $3_4$ on-track to start reading data at tracks (x+7), (x+9), and (x+10). From this point on, the above operations repeat until the desired recorded data has been read from the CD-ROM 1 in the sequence in which it was recorded, using the three valid beams $3_1$, $3_3$, and $3_4$, operating at high speed, and with no duplications or gaps in the data.

In this method, for example, it takes the time of four revolutions of CD-ROM 1 to read the data in the nine tracks between (x−1) and (x+7) and complete the one track jump, as indicated in FIG. 12. The data read time using this method, then, is a major improvement over the time of nine revolutions of CD-ROM 1 that would be required read the same data with only one beam.

Figure 14:
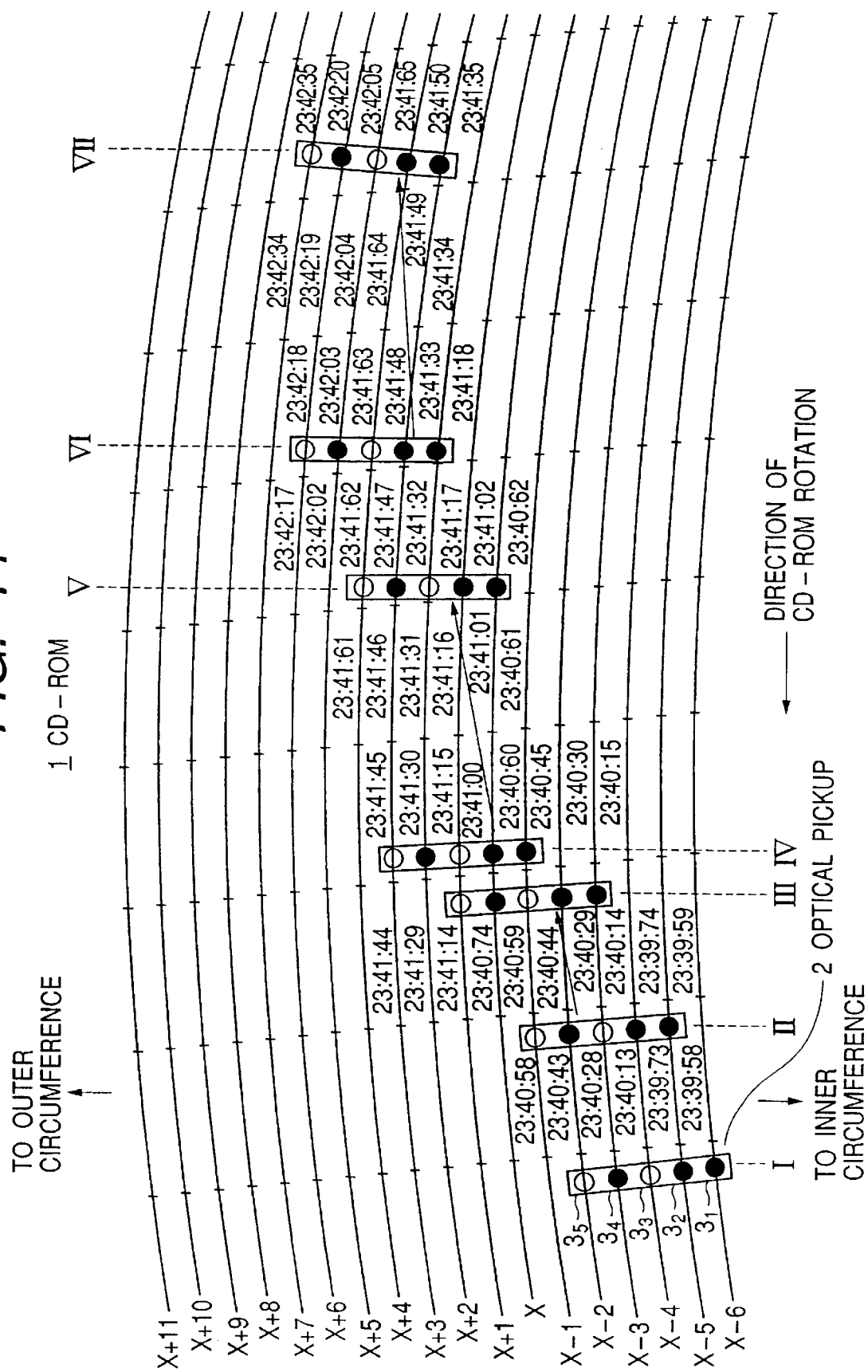
FIG. 14 shows an example of a data read operation in the CD-ROM readout system of FIG. 1.

(8) Special Write/Read Operation, Part 6 (Beam Channel $3_1$, $3_2$ and $3_4$ Unreadable) (FIG. 14)

If the system controller 50 determines, during one revolution of relative motion between the optical pickup 2 and CD-ROM 1, starting from position I of FIG. 14, that recorded data cannot be read from the beam $3_1$, $3_2$ and $3_4$ channels, then there are not three adjacent channels from which data can be read (the M≧3 condition is not satisfied). As in the case illustrated in FIG. 12, however, in repeated cycles of continuous reading and track jump operations, the number of disk revolutions of continuous reading, and the number of tracks to be jumped, may be determined as follows: with Q as the distance, in number of tracks, between the innermost and outermost beams of light beam channels capable of reading recorded data, and R as the number of beams in the most populous contiguous group of light beam channels incapable of reading recorded data, whose beams lie between the above innermost and outermost light beams, then if Q is at least 2, and R is at least 1, (R+1) is the number of disk revolutions of continuous reading by the beams capable of reading recorded data (I), and (Q−1) is the number of tracks to be jumped (J).

In the present case, the innermost and outermost beams of light beam channels capable of reading recorded data, are beams $3_3$ and $3_5$. Therefore, Q=(5−3)=2. Also, the most populous contiguous group of light beam channels incapable of reading recorded data, whose beams lie between beams $3_3$ and $3_5$, consists of only one light beam. Therefore, R=1. The two beams that are capable of reading recorded data, $3_3$ and $3_5$, are designated as the h light beam channels. The number of disk revolutions of continuous reading=I=(R+1)=2. The number of tracks to be jumped in track jumps performed during read=J=(Q−1)=1. These values of I and J are set.

When the h=2 valid light beam channels are designated, and the values of I (the number of disk revolutions in a continuous data read) and J (the number of tracks jumped in a track jump) are set to I=2 and J=1, if the optical pickup 2 is located at position II of FIG. 14, it will be jumped forward from position II by two tracks, to put beams $3_3$ and $3_5$ on-track at tracks (x−1) and (x+1) (position III in FIG. 14). Simultaneous reading of the recorded data in tracks (x−1) and (x+1) will then begin at that point, through the two channels (circuits) made up of photodetector $PD_3$ through first signal processing circuit $26_3$, and photodetector $PD_5$ through first signal processing circuit $26_5$. Also, when HIGH level frame sync detect signals $FS_3$, and $FS_5$ are received from both of the first signal processing circuits $26_3$, and $26_5$, a special write/read command including valid channel information "3, 5" is sent to parallel-to-serial converter 30.

From that point on, operation is almost the same as for the case illustrated in FIG. 12. (In the FIG. 14 case, the write controllers $31_3$ and $31_5$ write the data $DATA_3$ and $DATA_5$, from first signal processor circuits $26_3$ and $26_5$, and the A-time data $AT_3$ and $AT_5$ to memories $32_3$ and $32_5$, and $33_3$ and $33_5$. Also, the read controller 34 checks the A-time and start and end address data stored in memories $33_3$ and $33_5$, and then reads out the data stored in memories $32_3$ and $32_5$, so that it will be in A-time sequence, and will have no duplications or gaps in it.) At the location where recorded data has been read for approximately I=2 revolutions of the CD-ROM 1, a forward jump of J=1 track is executed, and after reading data for another I=2 turns, another jump of J=1 is executed, and so on, continuing in this manner, to read the recorded data at high speed, in the sequence in which it was recorded, with no duplications or gaps in the output data.

In this method, for example, it takes the time of four revolutions of CD-ROM 1 to read the data in the seven tracks between (x−1) and (x+5) and complete the one track jump, as indicated in FIG. 14. With only two good channels, then, the data read time using this method is still a major improvement over the time of seven revolutions of CD-ROM 1 that would be required read the same data with only one beam.

Figure 15:
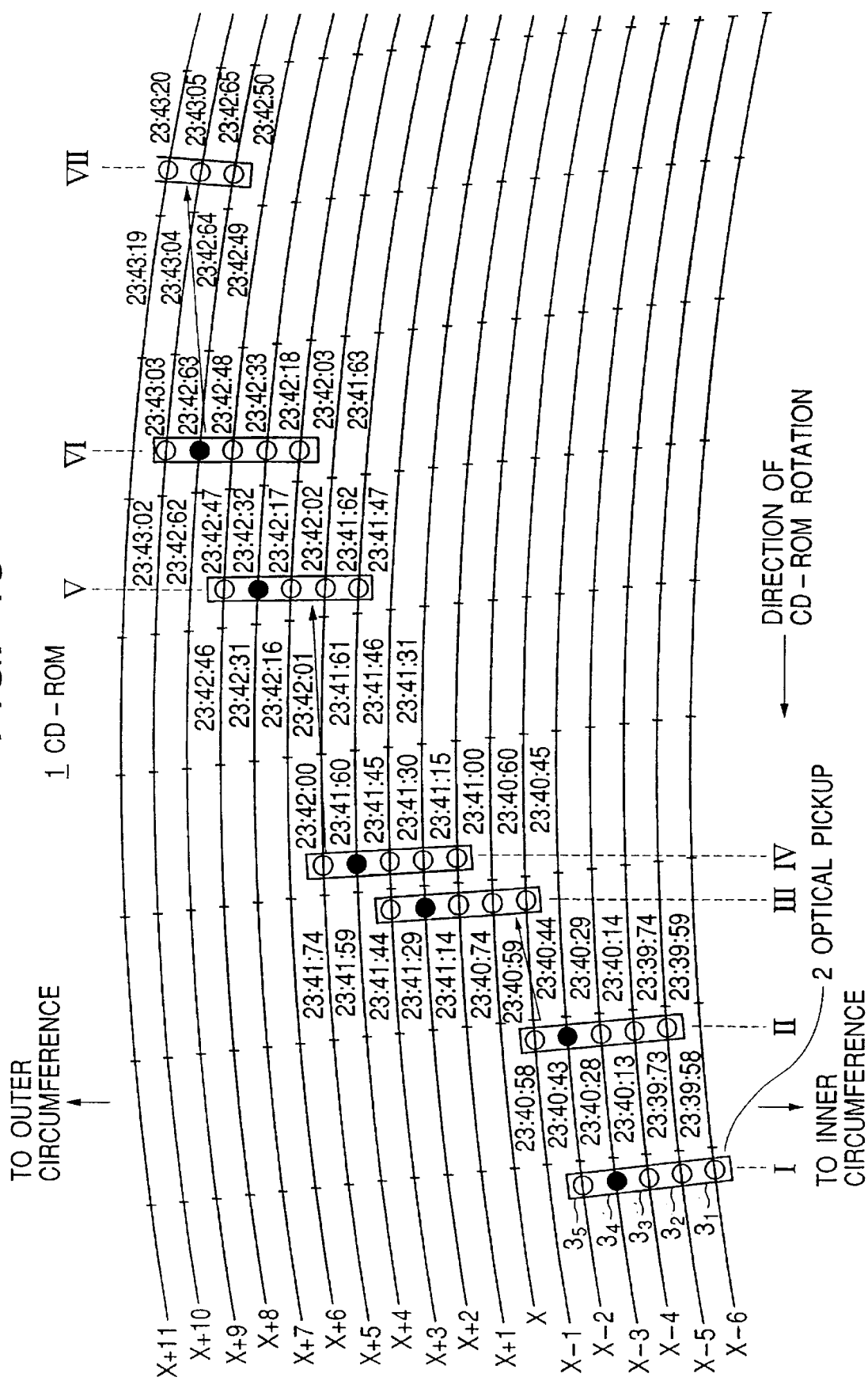
FIG. 15 shows an example of a data read operation in the CD-ROM readout system of FIG. 1.

(9) Special Write/Read Operation, Part 7 (Beam Channel $3_4$ Unreadable) (FIG. 15)

If the system controller 50 determines, during one revolution of relative motion between the optical pickup 2 and CD-ROM 1, starting from position I of FIG. 15, that recorded data cannot be read from the light beam $3_4$ channel, the contiguous group of the three beams $3_1$–$3_3$ could be used to read data as described in the above section (4) and shown in FIG. 8. The data can be read faster, however, by performing the read operation as shown in FIG. 12.

In the present case, the innermost and outermost beams of the light beam channels capable of reading recorded data are $3_1$ and $3_5$, respectively; therefore, Q=[(5−1)]=4. Also, the number of beams in the most populous contiguous group of light beam channels incapable of reading recorded data, whose beams lie between the above innermost and outermost light beams ($3_1$ and $3_5$) is the single beam, $3_4$; therefore, R=1. Accordingly, the beams $3_1$, $3_2$, $3_3$ and $3_5$ are allocated as the h valid channels; R (the number of disk revolutions of continuous reading) and J (the number of tracks jumped in a track jump), respectively, are set to I=(R+1)=2, and J=(Q−1)=3.

When the h=4 valid light beam channels are designated, and the values of I=2 (the number of disk revolutions in continuous data read) and J=3 (the number of tracks jumped in a track jump) are set, if the optical pickup 2 is located at position II of FIG. 15, it will be jumped forward from position II by four tracks, to put beams $3_1$–$3_3$ and $3_5$ on-track at tracks (x−1)–(x+1), and (x+3). Simultaneous reading of the recorded data in tracks (x−1) through (x+1) and (x+3) will then begin at that point, through the four channels made up of photodetector $PD_1$ through first signal processing circuit $26_1$, photodetector $PD_2$ through first signal processing circuit $26_2$, photodetector $PD_3$ through first signal processing circuit $26_3$, and photodetector $PD_5$ through first signal processing circuit $26_5$. Also, when HIGH frame sync detect signals $FS_1$–$FS_3$ and $FS_5$ are received from all four of the first signal processing circuits $26_1$–$26_3$, and $26_5$, a special write/read command including the valid channel information "1, 2, 3, 5" is sent to parallel-to-serial converter 30.

From that point on, operation is almost the same as for the case illustrated in FIG. 12. (In the FIG. 15 case, the write controllers $31_1$–$31_3$ and $31_5$ write the data $DATA_1$–$DATA_3$ and $DATA_5$ from first signal processor circuits $26_1$–$26_3$ and $26_5$, and the A-time data $AT_1$–$AT_3$ and $AT_5$ to memories $32_1$–$32_3$ and $32_5$, and $33_1$–$33_3$ and $33_5$. Also, the read controller 34 checks the A-time and start and end address data stored in memories $33_1$–$33_3$ and $33_5$, and then reads out the data stored in memories $32_1$–$32_3$ and $32_5$ so that it will be in A-time sequence, and will have no duplications or gaps in it.) At the location where recorded data has been read for approximately I=2 revolutions of the CD-ROM 1, a forward jump of J=3 tracks is executed, and after reading data for another I=2 revolutions, another J=3 jump is executed, and so on, continuing in this manner to read the recorded data, at high speed, in the sequence in which it was recorded, and with no duplications or gaps in the output data (FIG. 15, positions III–VII).

In this example, it takes the time of four revolutions of CD-ROM 1 to read the data in the eleven tracks between (x−1)–(x+9), and to complete the one track jump, as indicated in FIG. 15. In comparison, in FIG. 8, three track jumps are required to read data for the time of four revolutions of the CD-ROM 1.

Figure 16:
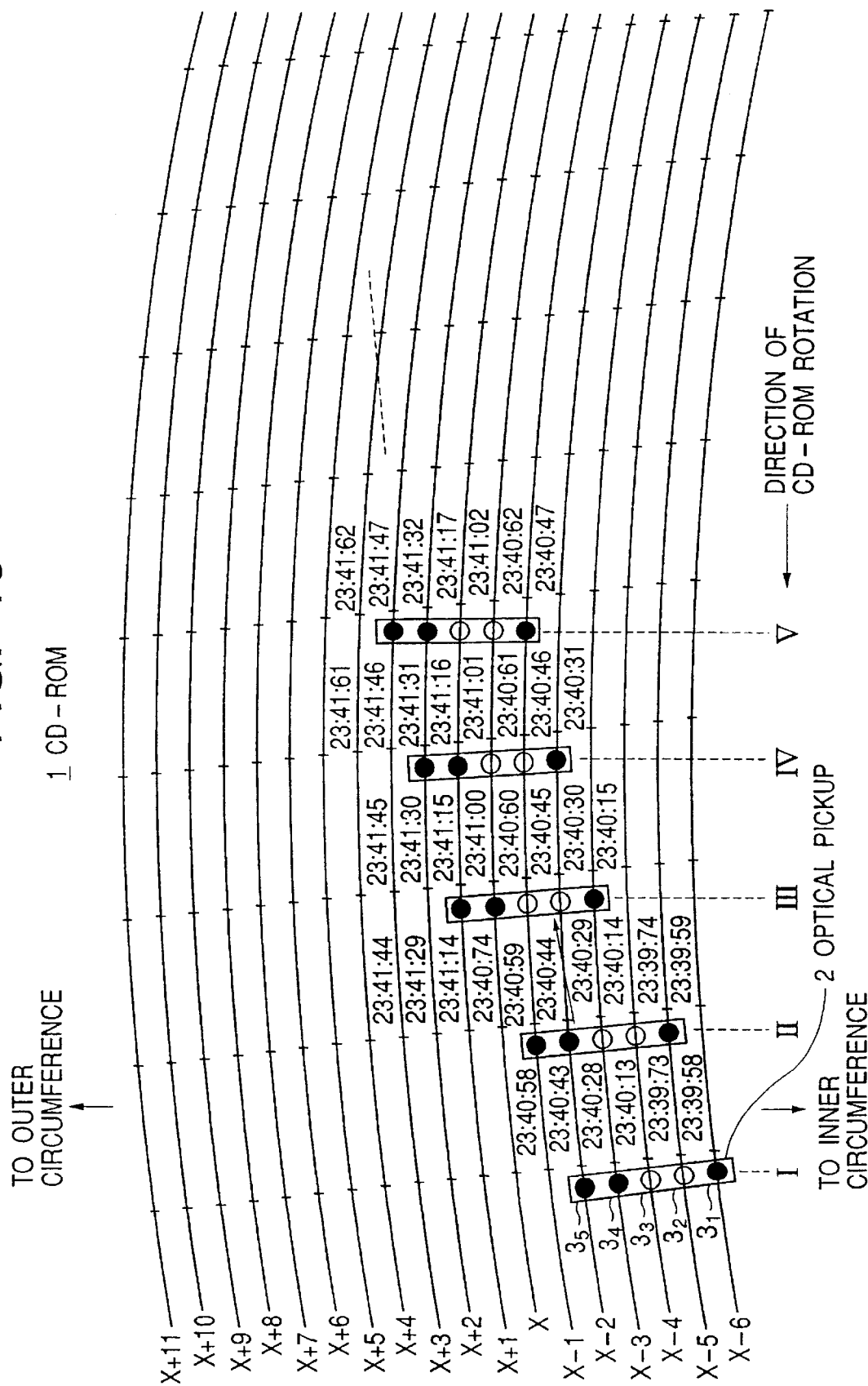
FIG. 16 shows an example of a data read operation in the CD-ROM readout system of FIG. 1.
Figure 17:
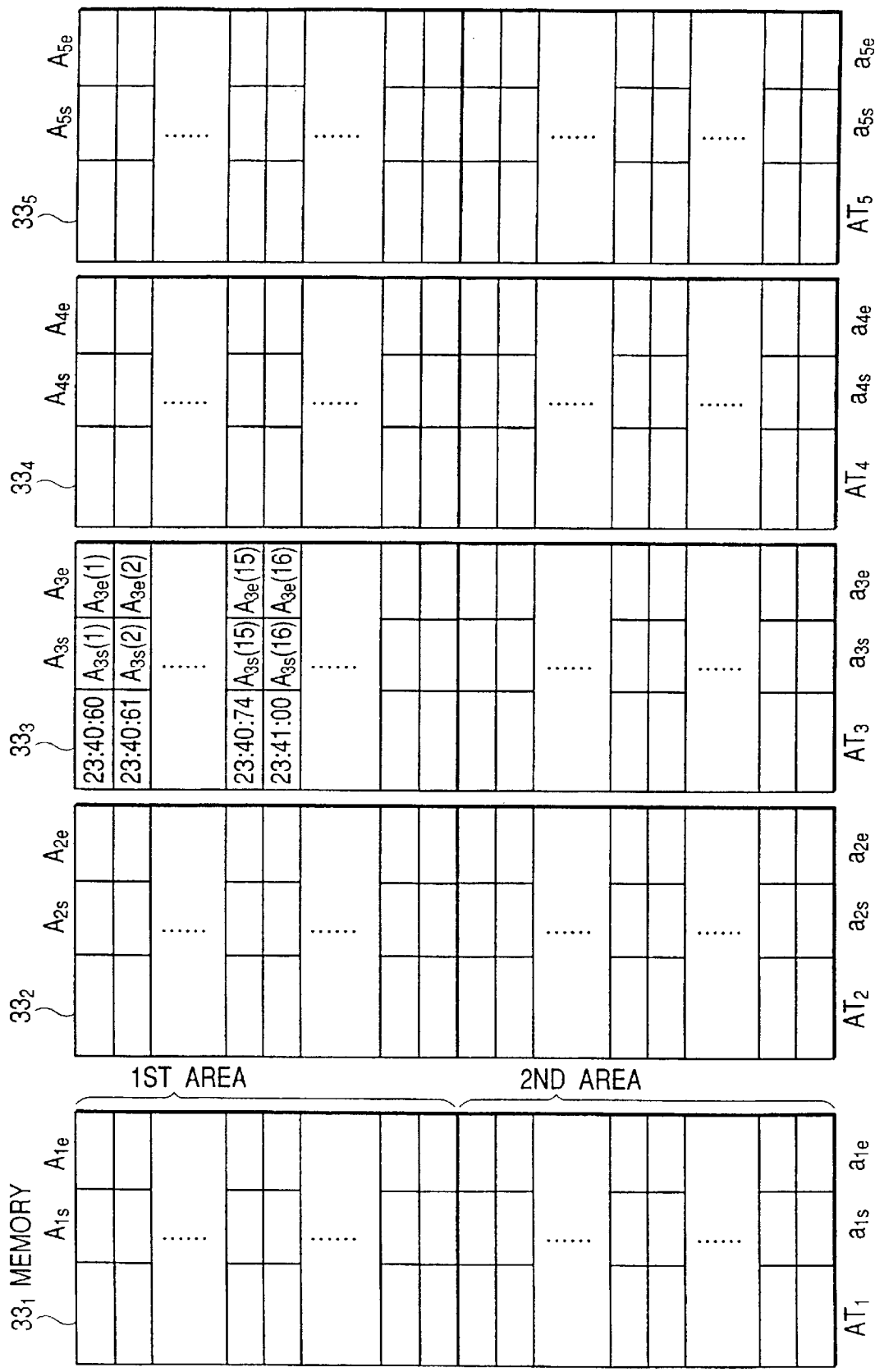
FIG. 17 shows an example of the contents of the memories of FIG. 2.

(10) Special Write/Read Operation, Part 8 (Beam Channels $3_1$, $3_4$ and $3_5$ Unreadable) (FIGS. 16 and 17)

We will now consider the case where it is determined, during one revolution of relative motion between the optical pickup 2 and CD-ROM 1, starting from position I of FIG. 16, that recorded data cannot be read from the light beam $3_3$, $3_4$, and $3_5$ channels. If we try to read as before (by performing repeated cycles alternating between reading for one or more revolutions of CD-ROM 1 and executing a forward track jump) with only the two remaining adjacent channels $3_2$ and $3_3$, there will be gaps in the data. In this situation, the data must be read from CD-ROM 1 continuously by only one light beam channel.

Specifically, of the two light beams that can read data, $3_2$ and $3_3$, the one nearer the center [of the disk] ($3_3$) is designated as the valid channel (h=1), the number of disk revolutions of continuous reading is set to I=unlimited, and the number of tracks jumped in a track jump is set to J=0.

When the h=1 valid light beam channels are designated and the values "I=unlimited" (the number of disk revolutions in a continuous data read) and "J=0" (the number of tracks jumped in a track jump) are set, if the optical pickup 2 is located at position II of FIG. 16, it will be jumped forward from position II by two tracks, to put beam $3_3$ on-track at track (x−1). Reading of the recorded data in track (x−1) then begins at that point, through the single channel made up of photodetector $PD_3$ through first signal processing circuit $26_3$. Also, when a HIGH level frame sync detect signal $FS_3$ is received from the first signal processing circuit $26_3$, a special write/read command including valid channel information "3" is sent to parallel-to-serial converter 30.

A special write/read command is fed through read controller 34 to the write controllers. After that, only the write controller $31_3$ (identified by the [special write/read command] valid channel information "3") writes the $DATA_3$ data received from first signal processor circuit $26_3$, a block at a time, to the first area of the memory $32_3$, in sequence [(the sequence in which it was recorded)]. The write controller also writes the A-time data corresponding to the above data to memory, along with the memory addresses at which that data is located, by writing $AT_3$ (the A-time data for $DATA_3$) to the first area of memory $33_3$ along with the start address $A_3$, and end address $A_{3e}$ of memory $32_3$ at which $DATA_3$ is stored. For the case illustrated in FIG. 16, the data written as A-time data in the first area of the memory $33_3$, would start with 23:40:60 as shown in FIG. 17. If enough data is written to the first areas of memories $32_3$ and $33_3$ to fill them, the write controller automatically goes back to the first area and continues writing.

When the read controller 34 receives the special write/read command, if only one channel (3) is indicated in the valid channel information, it accesses only the data written to the first area of the memory for that channel, memory $33_3$, and reads the data from the first area of memory $32_3$ in A-time sequence, starting with the data corresponding to the newest A-time, outputting it to the second signal processing circuit 40. It issues no halt or track jump commands. Thus during data read, optical pickup 2 simply reads data from (x−1) and subsequent tracks through the beam 33 channel, reading continuously without jumping tracks as CD-ROM 1 rotates, sending the data to the input of the second signal processing circuit 40.

(11) Special Write/Read Operation, Part 9 (Beam Channels $3_1$, $3_2$, $3_4$ and $3_5$ Unreadable) (FIG. 18)

If it is determined, during one revolution of relative motion between the optical pickup 2 and CD-ROM 1, starting from position I of FIG. 18, that recorded data cannot be read from the light beam $3_1$, $3_2$, $3_4$, and $3_5$ channels; and if we try to read as before (by performing repeated cycles alternating between reading for one or more revolutions of CD-ROM 1 and executing a forward track jump) with only the one remaining adjacent channel $3_3$, there will be gaps in the data. Here too, the data must be read from CD-ROM 1 continuously (with no track jumps) using only one light beam channel.

Specifically, the single light beam that can read data ($3_3$) is designated as the valid channel (h), the number of disk revolutions of continuous reading is set to I=unlimited, and the number of tracks jumped in a track jump is set to J=0.

When the h=1 valid light beam channels are designated, and the values "I=unlimited" (the number of disk revolutions in a continuous data read) and "J=0" (the number of tracks jumped in a track jump) are set, if the optical pickup 2 is located at position II of FIG. 18, it will be jumped forward from position II by two tracks, to put beam $3_3$ on-track at track (x−1). Reading of the recorded data in track (x−1) then begins at that point, through the single channel made up of photodetector $PD_3$ through first signal processing circuit $26_3$. Also, when [a HIGH] frame sync detect signal $FS_3$ is received, a special write/read command including valid channel information "3" is sent to parallel-to-serial converter 30.

From this point on, operation is exactly the same as for the case illustrated in FIG. 16: Data from (x−1) and subsequent tracks are all read through the beam $3_3$ channel, reading continuously as CD-ROM 1 rotates, without having optical pickup 2 jump tracks, and outputting the data with no gaps.

Moreover, although the above embodiment was described for n=5 optical beams, the desired effect can be achieved as long as there are three or more beams. With an optical pickup 2A, such as shown in FIG. 19(1), for example, if data through the channel the center beam ($3_2$) of beams $3_1$–$3_3$ became unreadable (assuming that the focus and tracking error signals are generated from the returned beam of light beam $3_1$ or $3_3$), then with Q=2 and R=1 (as in the case illustrated in FIG. 14), the two beams $3_1$ and $3_3$ would be designated as valid channels, and I (the number of disk revolutions in a continuous data read) and J (the number of tracks jumped in a track jump) set to I=(R+1)=2 and J=(Q−1)=1.

Figure 19A:
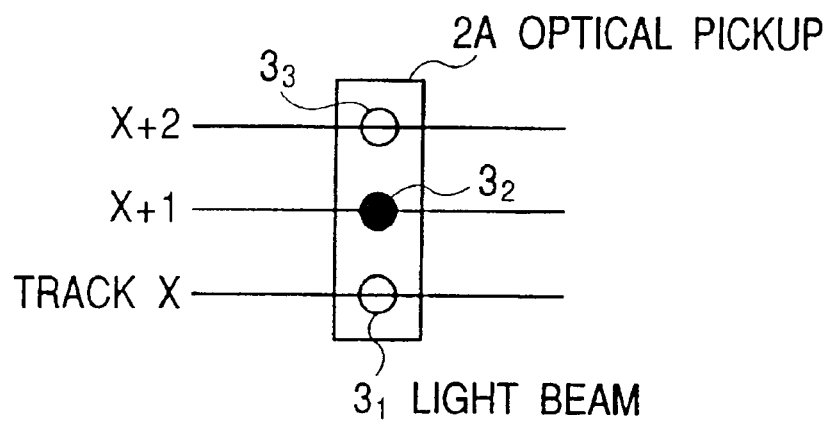
FIG. 19 shows the configuration of an optical pickup for another embodiment [of the present invention].
Figure 19B:
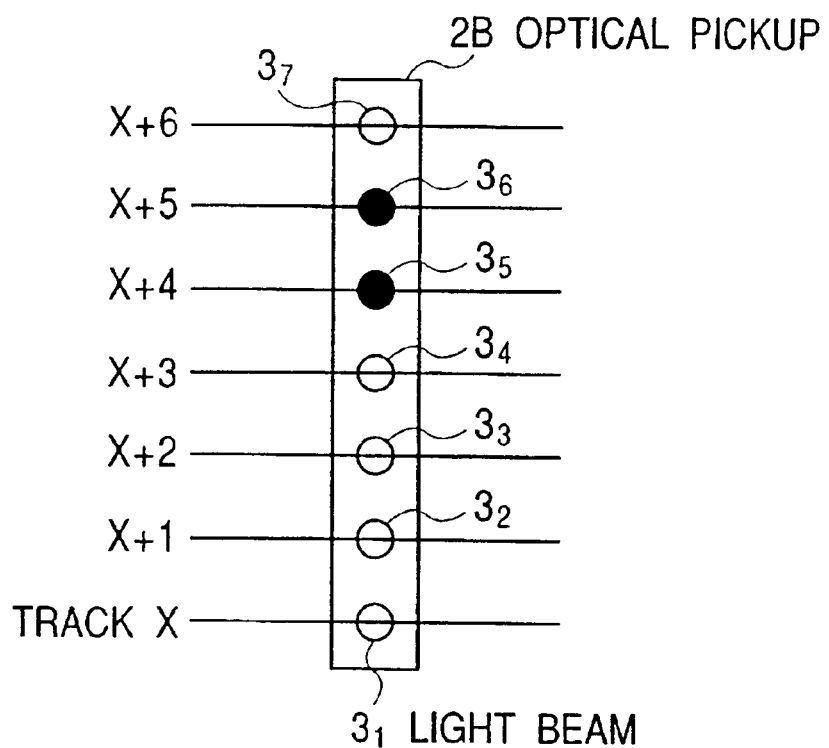

With an optical pickup having the seven beams $3_1$–$3_7$ as shown in FIG. 19(2), if data became unreadable through the $3_5$ and $3_6$ light beam channels (assuming that the focus and tracking error signals are generated from the returned beam of light beam $3_4$), then Q=6 and R=2, and all five of the readable beams $3_1$–$3_4$ and $3_7$ should be designated as valid channels, and I (the number of disk revolutions in a continuous data read) and J (the number of tracks jumped in a track jump) set to I=(R+1)=3 and J=(Q−1)=5.

In addition, as in the case described section (3) and illustrated in FIGS. 6 and 7, where the beam $3_5$ channel was unreadable, "M" (the number of beams in the largest contiguous group of beam channels from which data can be read) was made up of the four beams $3_1$–$3_4$. Therefore, since M≧3, the channels of the M beams ($3_1$–$3_4$) were designated as the h valid beam channels, and I and J were set to I=1, (where I is the number of disk revolutions in a continuous data read) and J=(M−2)=2 (where J is the number of tracks jumped in a track jump). However, with beams $3_1$–$3_4$ designated as the h valid beam channels, we have Q=(4−1)=3 (where Q is the distance, in number of tracks, between the innermost and outermost beams of light beam channels capable of reading recorded data, and R=0, (where R is the number of beams in the most populous contiguous group of light beam channels incapable of reading recorded data, whose beams lie between the above innermost and outermost light beams, $3_1$–$3_4$). Therefore, by using Q and R to computer the number of disk revolutions in a continuous data read (I) and the number of tracks in a track jump (J), we can set I=(R+1)=1, and J=(Q−1)=2.

Also, in the description of section (4) above (FIGS. 8 and 9), where the beam $3_4$ channel was unreadable, "M" (the number of beams in the largest contiguous group of beam channels from which data can be read) was made up of the three beams $3_1$–$3_3$. Therefore, since M≧3, the channels of the M beams ($3_1$–$3_3$) were designated as the h valid beam channels, and I and J were set to I=1, (where I is the number of disk revolutions in a continuous data read) and J=(M−2)=1 (where J is the number of tracks jumped in a track jump). However, with beams $3_1$–$3_3$ designated as the h valid beam channels, we have Q=(3−1)=2, where Q is the distance, in number of tracks, between the innermost and outermost beams ($3_1$ and $3_3$) of light beam channels capable of reading recorded data, and R=0, where R is the number of beams in the most populous contiguous group of light beam channels incapable of reading recorded data, whose beams lie between the above innermost and outermost light beams ($3_1$ and $3_3$). Therefore, by using this Q and R to compute the number of disk revolutions in a continuous data read (I) and the number of tracks in a track jump (J), we can set I=(R+g1)=1, and J=(Q−1)=1.

Similarly, in the case of the above section (5)((6)) as well, if Q is the distance, in number of tracks, between the innermost and outermost beams of the h=3 valid channels $3_1$–$3_3$ ($3_2$–$3_4$), then Q=2; and if R is the number of beams in the most populous contiguous group of light beam channels incapable of reading recorded data, whose beams lie between the innermost and outermost of the h=3 valid channels, $3_1$–$3_3$ ($3_2$–$3_4$), then R=0. Therefore, by using this Q and R to compute the number of disk revolutions in a continuous data read (I) and the number of tracks in a track jump (J), we can set I=(R+1)=1, and J=(R−1)=1.

Also, in the embodiment described above, the determination as to whether there were unreadable channels was made at a track location just before the "read start point" specified by the host computer. Then, based on the results of this determination, the h valid light beam channels, and the values of I and J were set (where I is the number of disk revolutions in a continuous data read and J is the number of tracks to be jumped per track jump), after which a track jump was executed to position the light beams at the read start point specified by the host computer, and the reading of data commenced at that point. Instead of doing it this way, however, the determination as to whether there are channels incapable of reading data may also be made at the track position that contains the read start point, or at the read-in[13] nearest the center of the CD-ROM 1.

Also, in all of the cases described in sections (3)–(9), and FIG. 19, the system controller 50 made a determination as to the light beam channels (if any) that were incapable of reading data; and if the results of this determination indicated that some of the channels were incapable of reading data, after a combination of the remaining channels capable of reading data were designated as the "h" (number) valid channels (where that combination consisted neither of only one channel nor of only two adjacent channels); the values of I (the number of disk revolutions in a continuous data read) and J (the number of tracks to be jumped in a track jump) were set, based on a prescribed standard. [As an alternative], however, in continuous reading of the CD-ROM 1 using a combination of the h beam channels designated as valid channels, the number of continuous reading revolutions of the optical disk that are required before there will be no gaps in the data read therefrom can be automatically determined as the constant (R+1) (where R is the number of beams in the most populous contiguous group of light beam channels incapable of reading recorded data, whose beams lie between the innermost and outermost of the h valid channels); thus requiring only "J," the number of tracks jumped in a track jump, to be set. In continuous reading of the CD-ROM 1 using the combination of all of the n beam channels (where there are no bad channels), the number of continuous reading revolutions of the optical disk that are required before there will be no gaps in the data read therefrom is also automatically determined as approximately 1.

Also, although in the above described embodiment, it was assumed that the CD-ROM 1 was rotated at a constant linear velocity, it may also be rotated at a constant angular velocity (CAV). The optical disk may be of a type other than CD-ROM. It may be, for example, a CD-WO, DVD, DVD-ROM, or DVD-RAM optical disk having its tracks formed in a spiral.

Through the present invention, even if some of the light beam channels become incapable of reading recorded data because of problems with optical disk such as track pitch variance, surface flutter, and eccentric wobble, it is possible to perform accurate high-speed reading of the desired data from an optical disk with no gaps in the data, by using all or a portion of the remaining light beam channels that are capable of reading recorded data.

What is claimed is:

1. An optical disk readout method wherein n adjacent tracks, n being an integer of 3 or greater, of an optical disk (1) are illuminated simultaneously by separate n light beams ($3_1, 3_2, \ldots, 3_n$) arranged in the radial direction of the optical disk in order to read recorded data in the tracks illuminated by the n light beams from outputs obtained by detecting reflected ones of the n light beams through n light beam-read channels ($21_i, 24i_i, 26_i, 31_i, 32_i, 33_i$ with i=1to n), CHARACTERIZED BY, detecting the relative positions in said radial direction of light beams associated with the light beam-read channels capable of reading recorded data from the optical disk;

designating a set of said light beam-read channels which are capable of reading recorded data from the optical disk to be used for reading and determining the number of tracks to be jumped, according to the detected radial positions of the light beams associated with the capable light beam-read channels;

continuously reading data from said disk with said set of light beam-read channels and storing the readout data and corresponding addresses of the optical disk during the continuous reading by said set of light beam-read channels designated for reading; and if said set comprises more than one light beam-read channel, executing the track jump by the determined number of tracks when the stored corresponding frame addresses show that said stored readout data correspond to a continuous block of data recorded on the optical disk, whereby the reading of the optical disk is performed by alternating between the continuous readings and track jumps in the forward direction.

2. The optical disk readout method according to claim 1, wherein when detecting that only one or two adjacent light beam-read channels are capable of reading the recorded data, only a single light beam-read channel is designated for reading and the continuous reading is successively conducted without executing the track jump.

3. The optical disk readout method according to claim 1, wherein M is the number of beams in the most populous contiguous group of light beam-read channels from which data can be read and $M \geq 3$, said M light beam-read channels are designated as said set of light beam-read channels, and the continuous reading of approximately one revolution of the optical disk and the track jump of (M−2) tracks are performed.

4. The optical disk readout method according to claim 1, wherein if Q is the distance, in number of tracks, between the innermost and outermost beams of light beam-read channels capable of reading recorded data, R is the number of beams in the most populous contiguous group of light beam-read channels incapable of reading recorded data, whose beams lie between said innermost and outermost light beams, and also if Q is at least 2, and R is at least 1, then the optical disk is read by alternating between performing continuous reading of the optical disk through the light beam-read channels that are capable of reading recorded data for approximately (R+1) revolutions of the optical disk, and executing a track jump of (Q−1) tracks in the forward direction.

5. The optical disk readout method according to claim 4, wherein when (Q−1) is equal or less than zero, a single light beam-read channel only is designated for reading and the continuous reading is successively performed without executing the track jump.

6. An optical disk readout apparatus wherein n adjacent tracks, n being an integer of 3 or greater, of an optical disk (1) are illuminated simultaneously by separate n light beams ($3_1, 3_2, \ldots 3_n$) arranged in the radial direction of the optical disk, comprising optical detection means (4, 5, 6, 7, 8, $PD_1$ to $PD_5$) for reading recorded data in the tracks illuminated by the n light beams, from output obtained by detecting reflected ones of the n light beams through n light beam-read channels ($21_i, 24_i, 26_i, 31_i, 32_i, 33_i$, with I=1to n), and readout control means for controlling the optical detection means to read the optical disk, CHARACTERIZED BY, means ($26_i$, 50) for detecting the relative positions in said radial direction of the light beams associated with the light beam-read channels capable of reading recorded data from the optical disk;

means (50) for designating set of said light beam-read channels which is capable of reading recorded data from the optical disk to be used for reading and for determining the number of tracks to be jumped, according to the detected radial positions of the light beams associated with the capable light beam-read channels;

means (20) for continuously reading data from said disk with said set of light beam-read channels;

means ($32_i, 33_i$) for storing the readout data and corresponding frame addresses of the optical disk during the continuous reading by said set of light beam-read channels designated for reading; wherein said readout control means has means (50) for executing the track jump by the determined number of tracks when the stored corresponding frame addresses show that the stored readout data corresponds to a continuous block of data recorded on the optical disk and only if said set comprises more than one light beam-read channel, whereby the reading of the optical disk is performed by alternating between the continuous readings and track jumps in the forward direction.

* * * * *